(12) United States Patent
Lee et al.

(10) Patent No.: US 12,379,748 B2
(45) Date of Patent: Aug. 5, 2025

(54) ELECTRONIC DEVICE INCLUDING FLEXIBLE DISPLAY

(71) Applicant: SAMSUNG ELECTRONICS CO., LTD., Suwon-si (KR)

(72) Inventors: Sangbong Lee, Suwon-si (KR); Hoyeon Kim, Suwon-si (KR); Soonwoo Kwon, Suwon-si (KR); Yongyi Kim, Suwon-si (KR); Jaesik Kim, Suwon-si (KR); Kyuyoung Lee, Suwon-si (KR); Jongsu Lee, Suwon-si (KR); Juha Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 17/831,517

(22) Filed: Jun. 3, 2022

(65) Prior Publication Data

US 2022/0413556 A1    Dec. 29, 2022

Related U.S. Application Data

(63) Continuation of application No. PCT/KR2022/007645, filed on May 30, 2022.

(30) Foreign Application Priority Data

Jun. 28, 2021 (KR) .................. 10-2021-0084042

(51) Int. Cl.
*G06F 1/16* (2006.01)
*H04M 1/02* (2006.01)

(52) U.S. Cl.
CPC .......... *G06F 1/1656* (2013.01); *G06F 1/1652* (2013.01); *G06F 1/1681* (2013.01);
(Continued)

(58) Field of Classification Search
CPC .... G06F 1/1656; G06F 1/1652; G06F 1/1681; H04M 1/0216; H04M 1/0268; H04M 2201/38
See application file for complete search history.

(56) References Cited

U.S. PATENT DOCUMENTS

| 10,964,918 B1 | 3/2021 | Chang et al. |
| 2016/0223879 A1* | 8/2016 | Tsai ............... G02F 1/1677 |

(Continued)

FOREIGN PATENT DOCUMENTS

| KR | 10-2016-0012679 | 2/2016 |
| KR | 10-2018-0008204 | 1/2018 |

(Continued)

OTHER PUBLICATIONS

Extended European Search Report dated Aug. 16, 2024 issued in European Patent Application No. 22833416.5.
(Continued)

*Primary Examiner* — Jinsong Hu
*Assistant Examiner* — Farideh Madani
(74) *Attorney, Agent, or Firm* — Nixon & Vanderhye P.C.

(57) ABSTRACT

According to various embodiments, an electronic device may include: a first housing, a second housing foldably connected to the first housing through a hinge, and a flexible display supported by the first housing and the second housing, the flexible display including a window layer having a first surface and a second surface facing a direction opposite to the first surface, and including a glass layer, and a display panel corresponding to the second surface under the window layer, wherein the glass layer includes a plurality of first patterns on the first surface, a surface of the plurality of first patterns being lower than the first surface, and a plurality of second patterns on the second surface, a surface of the plurality of second patterns being lower than (Continued)

the second surface, and a first etching amount per unit area of the plurality of first patterns and a second etching amount per the unit area of the plurality of second patterns are different.

20 Claims, 27 Drawing Sheets

(52) U.S. Cl.
CPC ....... *H04M 1/0216* (2013.01); *H04M 1/0268* (2013.01); *H04M 2201/38* (2013.01)

(56) References Cited

U.S. PATENT DOCUMENTS

| | | | | |
|---|---|---|---|---|
| 2018/0217639 | A1* | 8/2018 | Jones | G06F 1/1618 |
| 2018/0359869 | A1 | 12/2018 | Kim et al. | |
| 2020/0183457 | A1* | 6/2020 | Youn | G06F 1/1681 |
| 2020/0310494 | A1* | 10/2020 | Ahn | G06F 3/041 |
| 2020/0319672 | A1 | 10/2020 | Kim et al. | |
| 2021/0118337 | A1 | 4/2021 | Park et al. | |
| 2021/0191467 | A1 | 6/2021 | Sunwoo et al. | |
| 2021/0315116 | A1 | 10/2021 | Sunwoo et al. | |

FOREIGN PATENT DOCUMENTS

| | | |
|---|---|---|
| KR | 10-2018-0093649 | 8/2018 |
| KR | 10-2018-0135704 | 12/2018 |
| KR | 10-2146730 | 8/2020 |
| KR | 10-2020-0108754 | 9/2020 |
| KR | 10-2167404 | 10/2020 |
| KR | 10-2181655 | 11/2020 |
| KR | 10-2381327 | 4/2022 |
| KR | 10-2395734 | 5/2022 |

OTHER PUBLICATIONS

Search Report and Written Opinion dated Aug. 25, 2022 issued in International Patent Application No. PCT/KR2022/007645.

* cited by examiner

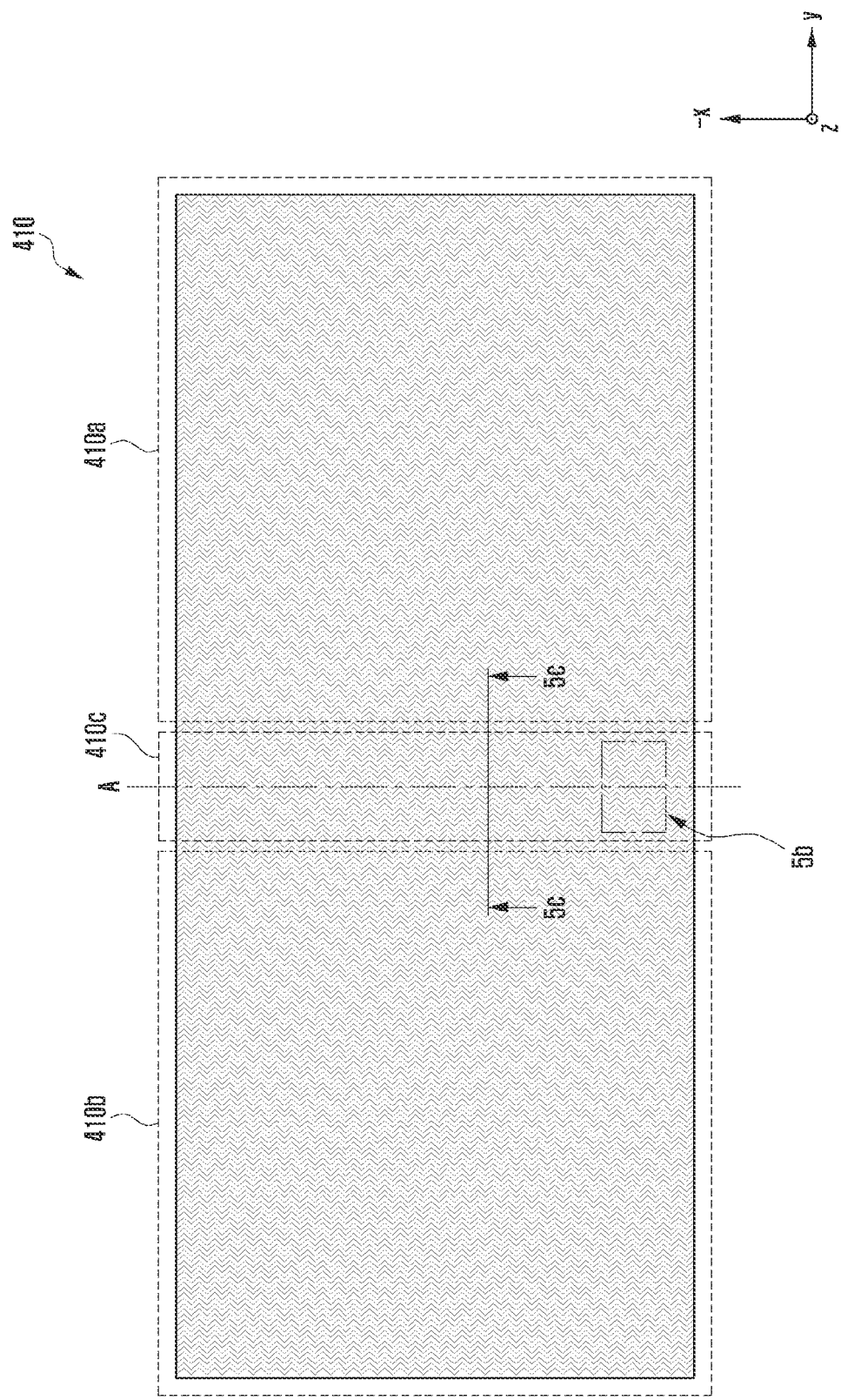

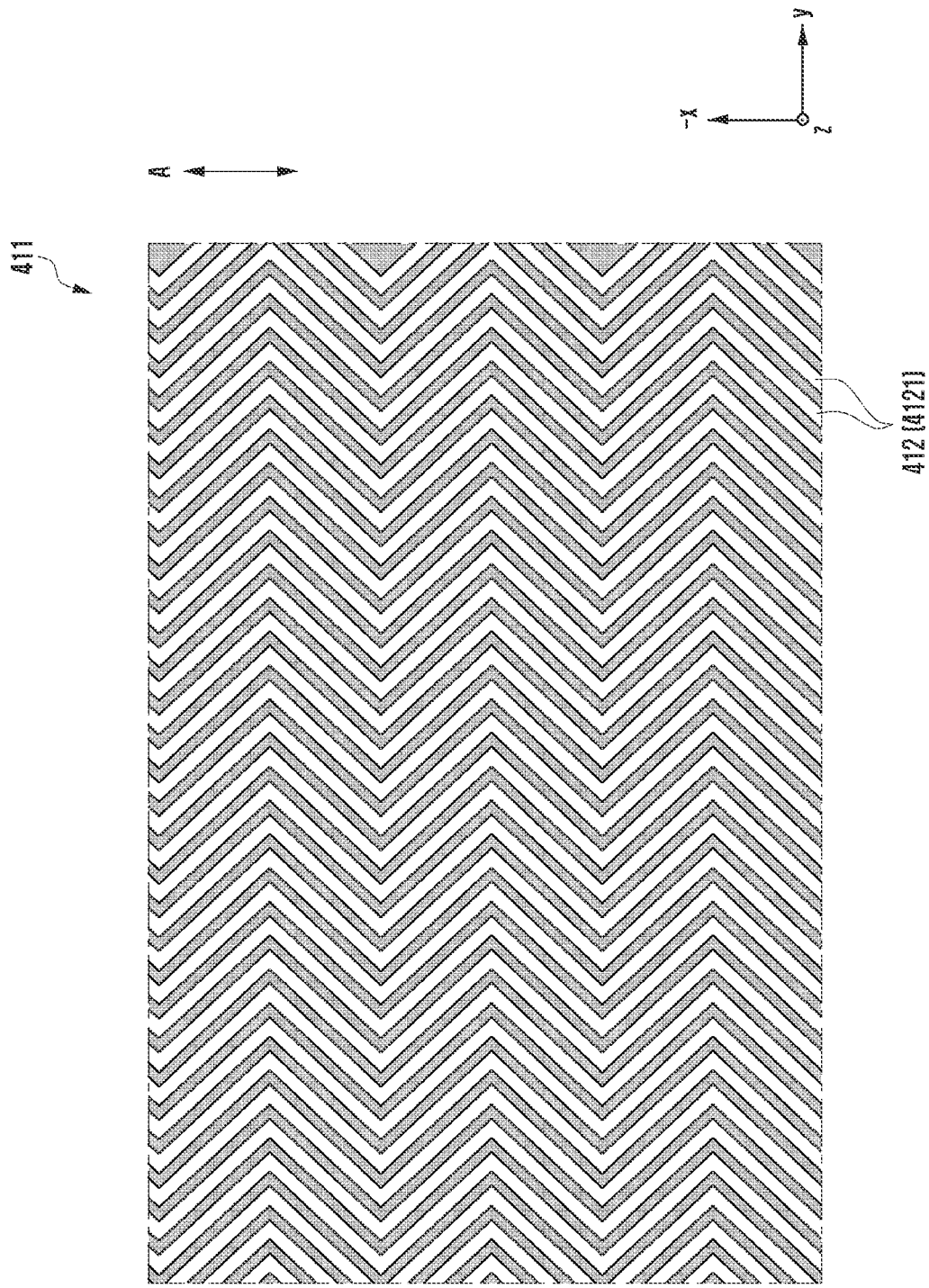

ELECTRONIC DEVICE INCLUDING FLEXIBLE DISPLAY

CROSS-REFERENCE TO RELATED APPLICATIONS

This application is a continuation of International Application No. PCT/KR2022/007645 designating the United States, filed on May 30, 2022, in the Korean Intellectual Property Receiving Office and claiming priority to Korean Patent Application No. 10-2021-0084042, filed on Jun. 28, 2021, in the Korean Intellectual Property Office, the disclosures of which are incorporated by reference herein in their entireties.

BACKGROUND

Field

The disclosure relates to an electronic device including a flexible display.

Description of Related Art

Electronic devices have been improved to be slimmer, to have increased rigidity, enhanced design aspects, and to have differentiated functional elements. Electronic devices are evolving from unilateral rectangular shapes to more diversified shapes. Electronic devices may have deformable structures such that large-screen displays are available while being carried conveniently. As examples of the deformable structures, electronic devices may include a foldable electronic device including at least two foldable housings folded or unfolded with regard to each other, a slidable electronic device including housings configured to slide by a designated reciprocating distance with regard to each other, and a rollable electronic device including at least one housing, the shape of which is changed in a rolling manner Such electronic devices may include a flexible display which is disposed to correspond to housings deformed in various manners, and which has an at least partially bendable area. Such a flexible display may be required to have improved visibility, flexibility, or rigidity.

An electronic device (for example, foldable electronic device, slidable electronic device, or rollable electronic device) may include a flexible display bendably supported through at least one housing. The flexible display may be disposed such that a display panel is stacked beneath a window layer made of a bendable polymer (for example, polyimide) material, thereby providing flexibility.

However, the window layer made of a polymer material may have poor transmittance of scratch resistance, although bendability/flexibility may be provided. In an attempt to solve this problem, at least a part of the window layer may be provided as a thin-film glass layer (for example, UTG (ultrathin glass)), but rigidity may be difficult to ensure because the same is formed as a thin film for providing bendability/flexibility. Moreover, the electronic device may include an electronic pen, and may need to include a flexible display having reinforced rigidity such that, when the pen tip of the electronic pen pressurizes the outer surface of the window layer with a constant pressurizing force, the same can be endured.

SUMMARY

Embodiments of the disclosure may provide an electronic device including a flexible display having flexibility secured such that the same can at least partially bend.

Embodiments of the disclosure may provide an electronic device including a flexible display having secured rigidity, excellent transmittance, and enhanced scratch resistance.

Embodiments of the disclosure may provide an electronic device including a flexible display configured such that uniform visibility can be secured with regard to a bending part.

Problems to be addressed by the disclosure are not limited to the above-mentioned problems, and may be variously expanded without deviating from the idea and scope of the disclosure.

According to various example embodiments, an electronic device may include: a first housing, a second housing foldably connected to the first housing through a hinge, and a flexible display disposed to be supported by the first housing and the second housing, the flexible display including a window layer having a first surface facing a first direction and a second surface facing in a second direction opposite to the first direction, and including a glass layer, and a display panel disposed to correspond to the second surface under the window layer, wherein the glass layer includes a plurality of first patterns on the first surface, a surface of the plurality of first patterns being lower than the first surface, and a plurality of second patterns on the second surface, a surface of the plurality of second patterns being lower than the second surface, wherein a first etching amount per unit area of the plurality of first patterns and a second etching amount per the unit area of the plurality of second patterns are different.

According to various example embodiments, an electronic device may include: at least one housing, and a flexible display including a bending region which is at least partially bendable through support of the at least one housing, the flexible display including a window layer having a first surface facing a first direction and a second surface facing in a second direction opposite to the first direction, and including a glass layer, and a display panel disposed to correspond to the second surface under the window layer, wherein the glass layer includes a plurality of first patterns on the first surface, a surface of the plurality of first patterns being lower than the first surface, and a plurality of second patterns on the second surface, a surface of the plurality of second patterns being lower than the second surface, and a first etching amount per unit area of the plurality of first patterns and a second etching amount per the unit area of the plurality of second patterns are different.

According to various example embodiments, an electronic device may include: a first housing, a second housing foldably connected to the first housing through a hinge, and a flexible display disposed to be supported by the first housing and the second housing, the flexible display including a window layer having a first surface facing a first direction and a second surface facing a second direction opposite to the first direction, and including a glass layer, and a display panel disposed to correspond to the second surface under the window layer, wherein the glass layer includes a plurality of patterns on the first surface, the plurality patterns being lower than the first surface or on the second surface, the plurality of patterns being lower than the second surface, and the plurality of patterns have a zigzag shape.

A flexible display according to various example embodiments of the disclosure may have different etching ratios configured with regard to multiple patterns disposed on oppositely-oriented surfaces of a glass layer, thereby providing efficient flexibility according to bending characteristics of an electronic device. In addition, a glass layer having a sufficient thickness is provided as a part of the window layer, thereby helping to secure rigidity (for example, pressure-resisting characteristics).

Various other advantageous effects identified explicitly or implicitly through the disclosure may be provided.

BRIEF DESCRIPTION OF THE DRAWINGS

In relation to the description of drawings, the same or similar reference numerals may be used for the same or similar components. Additionally, the above and other aspects, features and advantages of certain embodiments of the present disclosure will be more apparent from the following detailed description, taken in conjunction with the accompanying drawings, in which:

FIG. 5A is a diagram illustrating an example window layer according to various embodiments;

FIGS. 8A and 8B are diagrams illustrating example glass layers including a plurality of patterns according to various embodiments;

DETAILED DESCRIPTION

Figure 1A:
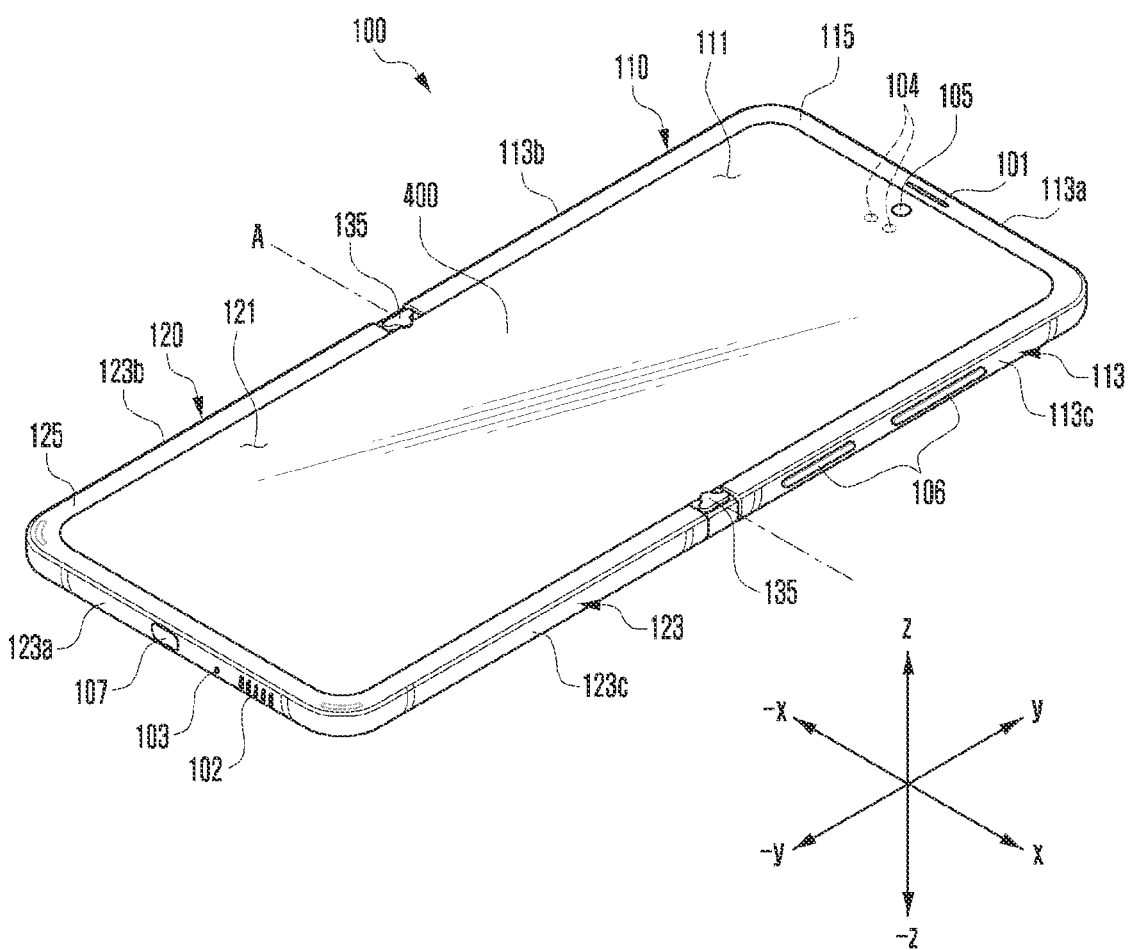
FIG. 1A is a front perspective view of an electronic device in an unfolded state according to various embodiments.
Figure 1B:
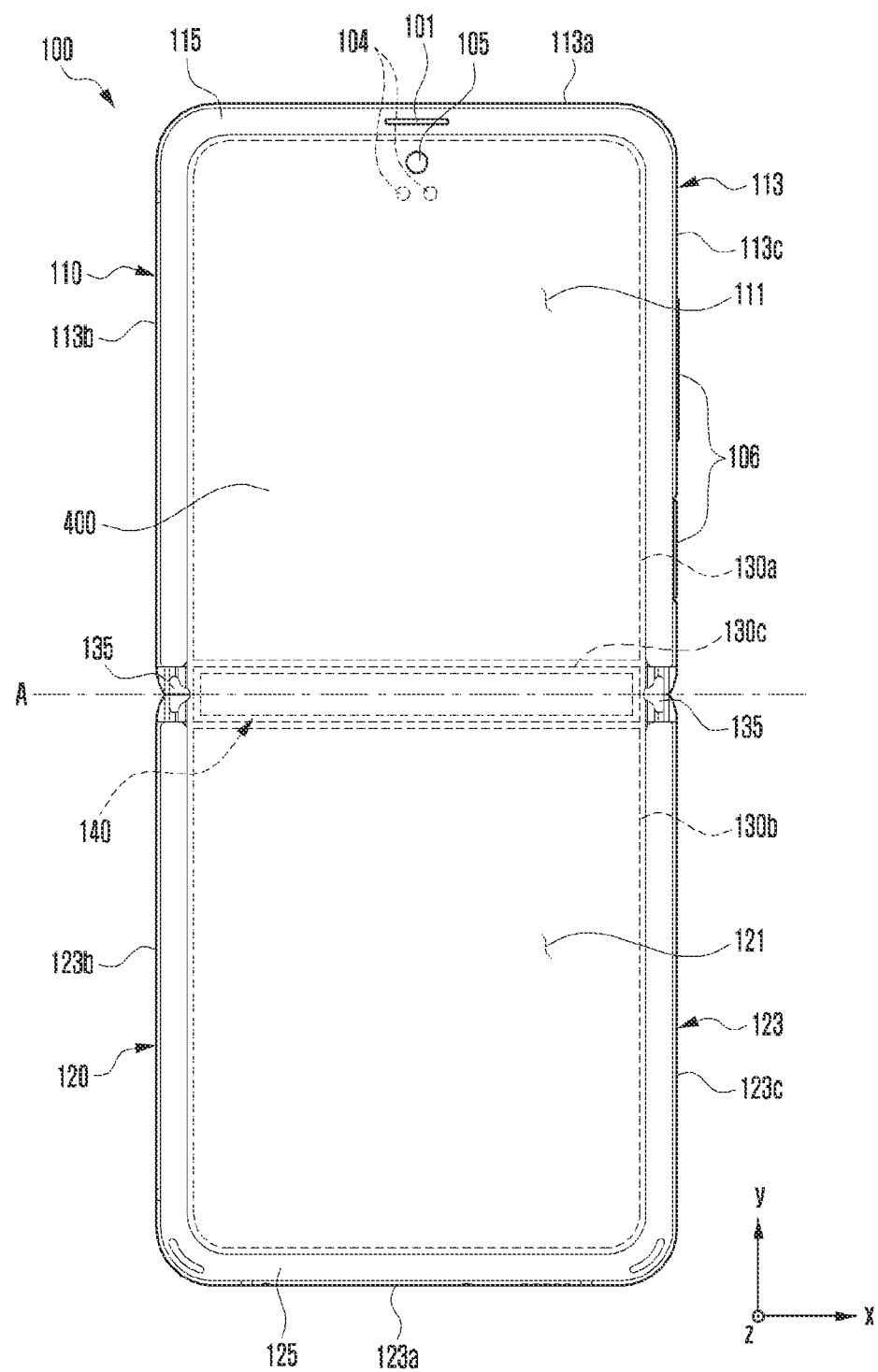
FIG. 1B is a diagram illustrating a front surface of an electronic device in an unfolded state according to various embodiments.
Figure 1C:
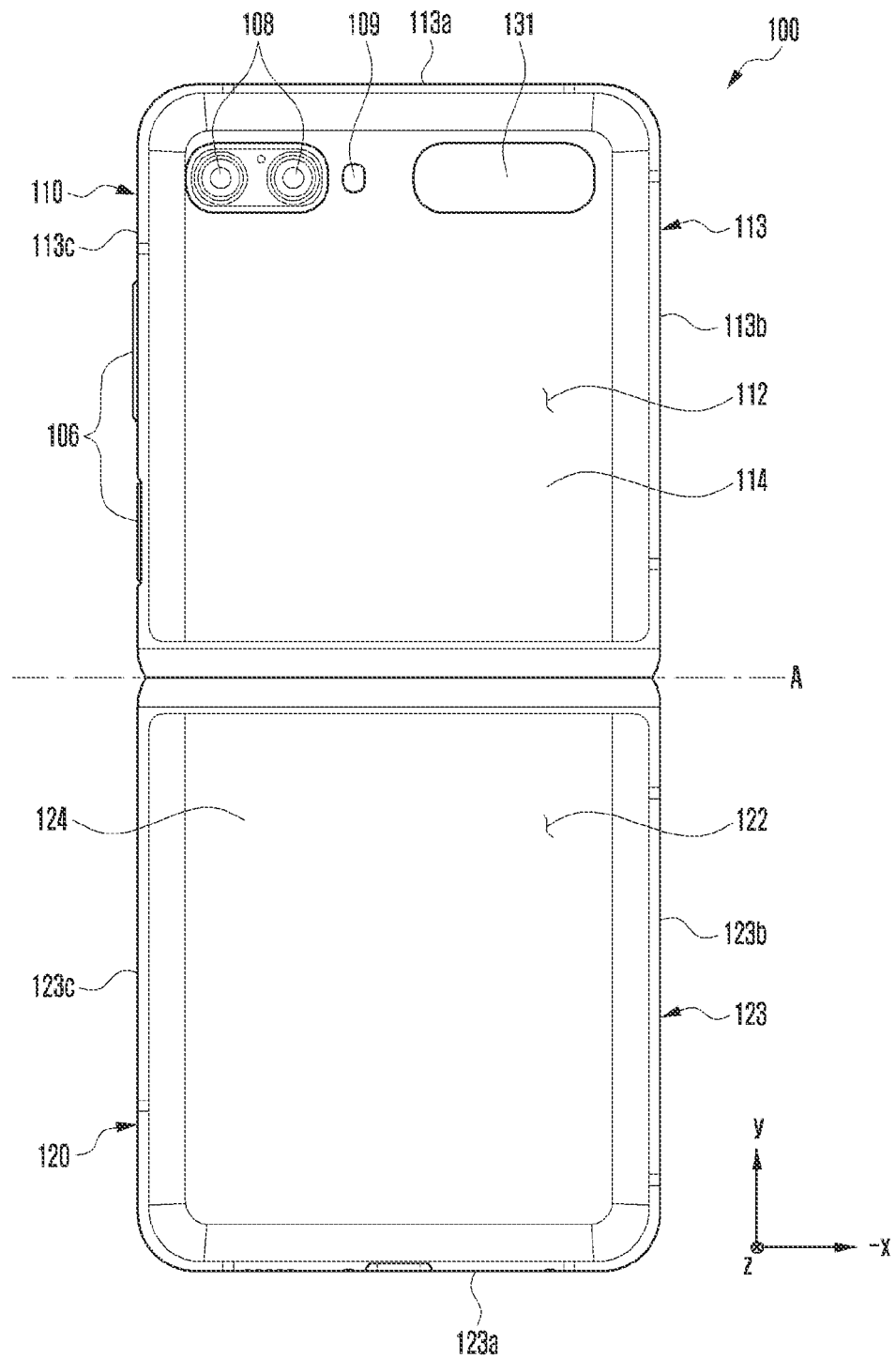
FIG. 1C is a diagram illustrating a rear surface of an electronic device in an unfolded state according to various embodiments.

FIG. 1A is a front perspective view of an electronic device in a flat or unfolded state according to various embodiments of the disclosure. FIG. 1B is a diagram illustrating the front of the electronic device in an unfolded state according to various embodiments. FIG. 1C is a diagram illustrating the back of the electronic device in an unfolded state according to various embodiments.

Figure 2A:
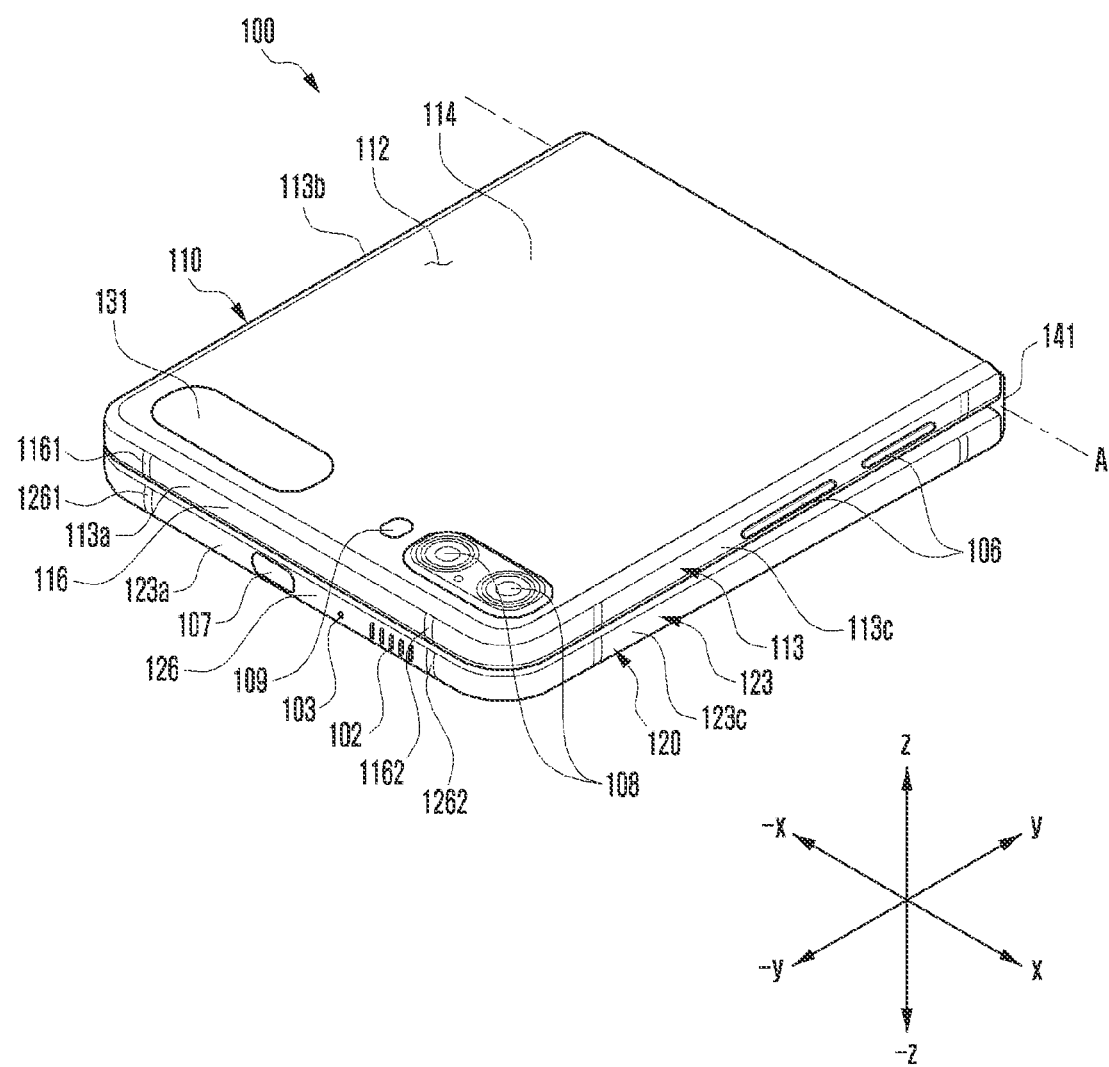
FIG. 2A is a perspective view of an electronic device, in a folded state according to various embodiments.
Figure 2B:
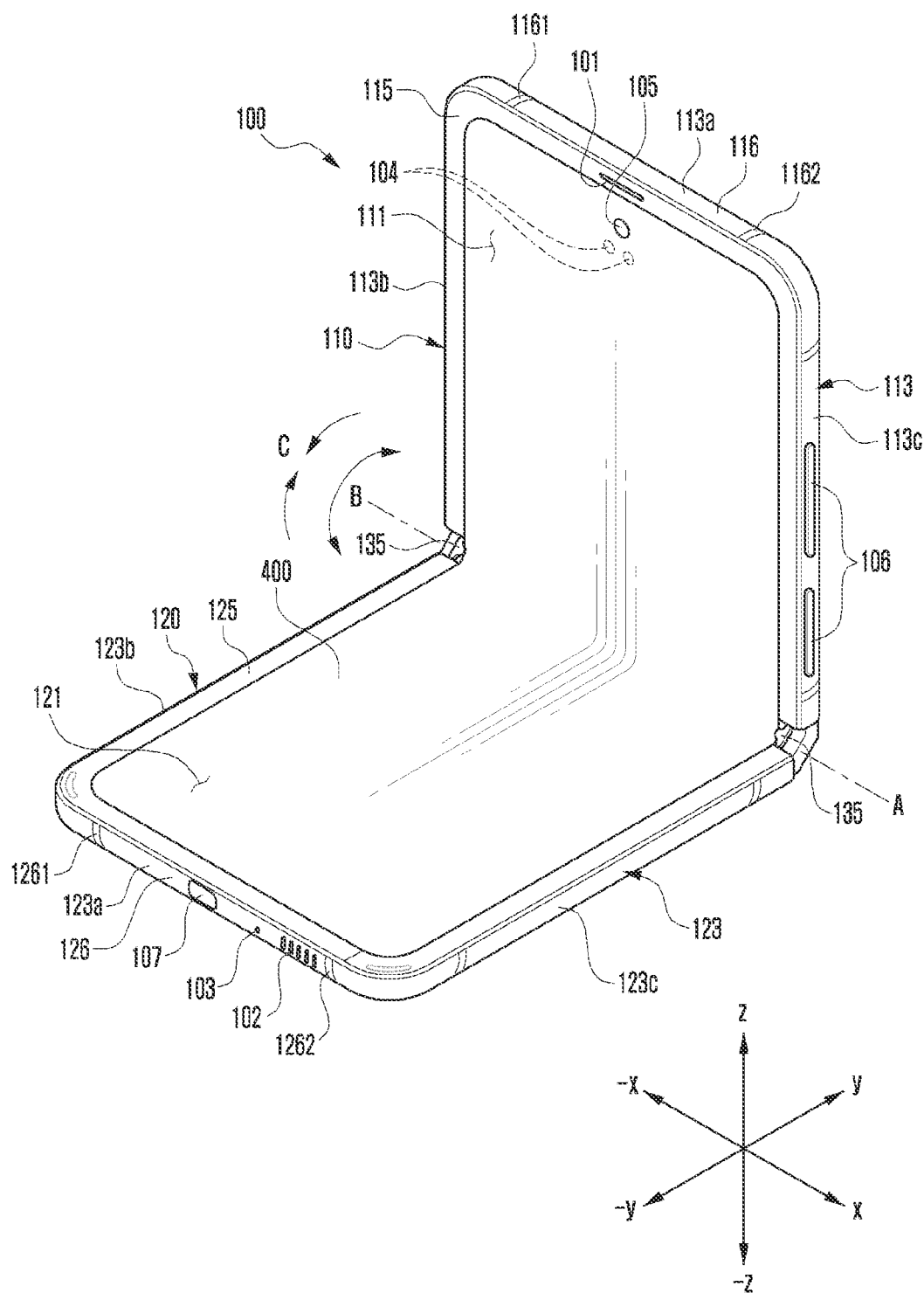
FIG. 2B is a perspective view of an electronic device, in an intermediate state according to various embodiments.

FIG. 2A is a perspective view of the electronic device in a folded state according to various embodiments. FIG. 2B is a perspective view of the electronic device in an intermediate state according to various embodiments.

With reference to FIGS. 1A, 1B, 1C, 2A and 2B, the electronic device 100 may include a pair of housings 110 and 120 (e.g., foldable housings) that are rotatably coupled as to allow folding relative to a hinge mechanism (e.g., hinge mechanism 140 in FIG. 1B). In various embodiments, the hinge mechanism (e.g., hinge mechanism 140 in FIG. 1B) may be disposed in the X-axis direction or in the Y-axis direction. In certain embodiments, two or more hinge mechanisms (e.g., hinge mechanism 140 in FIG. 1B) may be arranged to be folded in a same direction or in different directions. According to an embodiment, the electronic device 100 may include a flexible display 400 (e.g., foldable display) disposed in an area formed by the pair of housings 110 and 120. According to an embodiment, the first housing 110 and the second housing 120 may be disposed on both sides about the folding axis (axis A), and may have a substantially symmetrical shape with respect to the folding axis (axis A). According to an embodiment, the angle or distance between the first housing 110 and the second housing 120 may vary, depending on whether the state of the electronic device 100 is a flat or unfolded state, a folded state, or an intermediate state.

According to certain embodiments, the pair of housings 110 and 120 may include a first housing 110 (e.g., first housing structure) coupled to the hinge mechanism (e.g., hinge mechanism 140 in FIG. 1B), and a second housing 120 (e.g., second housing structure) coupled to the hinge mechanism (e.g., hinge mechanism 140 in FIG. 1B). According to an embodiment, in the unfolded state, the first housing 110 may include a first surface 111 facing a first direction (e.g., front direction) (z-axis direction), and a second surface 112 facing a second direction (e.g., rear direction) (negative z-axis direction) opposite to the first surface 111. According to an embodiment, in the unfolded state, the second housing 120 may include a third surface 121 facing the first direction (z-axis direction), and a fourth surface 122 facing the second direction (negative z-axis direction). According to an embodiment, the electronic device 100 may be operated in such a manner that the first surface 111 of the first housing 110 and the third surface 121 of the second housing 120 face substantially the same first direction (z-axis direction) in the unfolded state, and the first surface 111 and the third surface 121 face one another in the folded state. According to an embodiment, the electronic device 100 may be operated in such a manner that the second surface 112 of the first housing 110 and the fourth surface 122 of the second housing 120 face substantially the same second direction (negative z-axis direction) in the unfolded state, and the second surface 112 and the fourth surface 122 face one another in opposite directions in the folded state. For example, in the folded state, the second surface 112 may face the first direction (z-axis direction), and the fourth surface 122 may face the second direction (negative z-axis direction).

According to certain embodiments, the first housing 110 may include a first side member 113 that at least partially forms an external appearance of the electronic device 100, and a first rear cover 114 coupled to the first side member 113 that forms at least a portion of the second surface 112 of the electronic device 100. According to an embodiment, the first side member 113 may include a first side surface 113a, a second side surface 113b extending from one end of the first side surface 113a, and a third side surface 113c extending from the other end of the first side surface 113a. According to an embodiment, the first side member 113 may be formed in a rectangular shape (e.g., square or rectangle) through the first side surface 113a, second side surface 113b, and third side surface 113c.

According to certain embodiments, the second housing 120 may include a second side member 123 that at least partially forms the external appearance of the electronic device 100, and a second rear cover 124 coupled to the second side member 123, forming at least a portion of the fourth surface 122 of the electronic device 100. According to an embodiment, the second side member 123 may include a fourth side surface 123a, a fifth side surface 123b extending from one end of the fourth side surface 123a, and a sixth side surface 123c extending from the other end of the fourth side surface 123a. According to an embodiment, the second side member 123 may be formed in a rectangular shape through the fourth side surface 123a, fifth side surface 123b, and sixth side surface 123c.

According to certain embodiments, the pair of housings 110 and 120 are not limited to the shape and combinations illustrated herein, and may be implemented with a combination of other shapes or parts. For example, in certain embodiments, the first side member 113 may be integrally formed with the first rear cover 114, and the second side member 123 may be integrally formed with the second rear cover 124.

According to certain embodiments, in the unfolded state of the electronic device 100, the second side surface 113b of the first side member 113 and the fifth side surface 123b of the second side member 123 may be connected without a gap formed therebetween. According to an embodiment, in the unfolded state of the electronic device 100, the third side surface 113c of the first side member 113 and the sixth side surface 123c of the second side member 123 may be connected without a gap formed therebetween. According to an embodiment, in the unfolded state, the electronic device 100 may be configured such that the combined length of the second side surface 113b and the fifth side surface 123b is longer than the combined length of the first side surface 113a and/or the fourth side surface 123a. In addition, the combined length of the third side surface 113c and the sixth side surface 123c may be configured to be longer than the length of the first side surface 113a and/or the fourth side surface 123a. In various embodiments, in the unfolding state, the device 100 may be configured such that the sum of the lengths of the second side surface 113b and the fifth side surface 123b is shorter than or equal to the length of the first side surface 113a and/or the fourth side surface 123a. In addition, the sum of the lengths of the third side surface 113c and the sixth side surface 123c may be configured to be shorter than or equal to the length of the first side surface 113a and/or the fourth side surface 123a.

According to certain embodiments, the first side member 113 and/or the second side member 123 may be formed of a metal, and may further include a polymer injected into the metal. According to an embodiment, the first side member 113 and/or the second side member 123 may include at least one conductive portion 116 and/or 126 electrically segmented through one or more segmenting portions 1161 and 1162 and/or segmenting 1261 and 1262, which may be formed using a polymer. In this case, the at least one conductive portion may be electrically connected to a wireless communication circuit included in the electronic device 100, and may be used as an antenna operating in at least one designated band (e.g., legacy band).

According to certain embodiments, the first rear cover 114 and/or the second rear cover 124 may be formed of, for example, coated or tinted glass, ceramic, polymer, metal (e.g., aluminum, stainless steel or "STS", or magnesium), or a combination thereof.

According to certain embodiments, the flexible display 400 may be disposed to extend from the first surface 111 of the first housing 110 across the hinge mechanism (e.g., hinge mechanism 140 in FIG. 1B) to at least a portion of the third surface 121 of the second housing 120. For example, the flexible display 400 may include a first region 130a substantially corresponding to the first surface 111, a second region 130b corresponding to the second surface 121, and a third region 130c (e.g., the bendable region) connecting the first region 130a and the second region 130b and corresponding to the hinge mechanism (e.g., hinge mechanism 140 in FIG. 1B). According to an embodiment, the electronic device 100 may include a first protection cover 115 (e.g., first protection frame or first decoration member) coupled along the periphery of the first housing 110. According to an embodiment, the electronic device 100 may include a second protection cover 125 (e.g., second protection frame or second decoration member) coupled along the periphery of the second housing 120. According to an embodiment, the first protection cover 115 and/or the second protection cover 125 may be formed of a metal or polymer material. According to an embodiment, the first protection cover 115 and/or the second protection cover 125 may be used as a decorative member. According to an embodiment, the flexible display 400 may be positioned such that the periphery of the first region 130a is interposed between the first housing 110 and the first protection cover 115. According to an embodiment, the flexible display 400 may be positioned such that the periphery of the second region 130b is interposed between the second housing 120 and the second protection cover 125. According to an embodiment, the flexible display 400 may be positioned such that the periphery of the flexible display 400 corresponding to a protection cap 135 is protected through the protection cap disposed in a region corresponding to the hinge mechanism (e.g., hinge mechanism 140 in FIG. 1B). Consequently, the periphery of the flexible display 400 may be substantially protected from the outside. According to an embodiment, the electronic device 100 may include a hinge housing 141 (e.g., hinge cover) that is disposed so as to support the hinge mechanism (e.g., hinge mechanism 140 in FIG. 1B). The hinge housing 141 may further be exposed to the outside when the electronic device 100 is in the folded state, and be invisible as viewed from the outside when retracted into a first space (e.g., internal space of the first housing 110) and a second space (e.g., internal space of the second housing 120) when the electronic device 100 is in the unfolded state. In certain embodiments, the flexible display 400 may be disposed to extend from at least a portion of the second surface 112 to at least a portion of the fourth surface 122. In this case, the electronic device 100 may be folded so that the flexible display 400 is exposed to the outside (out-folding scheme).

According to certain embodiments, the electronic device 100 may include a sub-display 131 disposed separately from the flexible display 400. According to an embodiment, the sub-display 131 may be disposed to be at least partially exposed on the second surface 112 of the first housing 110, and may display status information of the electronic device 100 in place of the display function of the flexible display 400 in case of the folded state. According to an embodiment, the sub-display 131 may be disposed to be visible from the outside through at least some region of the first rear cover 114. In certain embodiments, the sub-display 131 may be disposed on the fourth surface 122 of the second housing 120. In this case, the sub-display 131 may be disposed to be visible from the outside through at least some region of the second rear cover 124.

According to certain embodiments, the electronic device 100 may include at least one of an input device 103 (e.g., microphone), sound output devices 101 and 102, a sensor module 104, camera devices 105 and 108, a key input device 106, or a connector port 107. In the illustrated embodiment, the input device 103 (e.g., microphone), sound output devices 101 and 102, sensor module 104, camera devices 105 and 108, key input device 106, and connector port 107 indicate a hole or shape formed in the first housing 110 or the second housing 120, but may be defined to include a substantial electronic component (e.g., input device, sound output device, sensor module, or camera device) that is disposed inside the electronic device 100 and operated through a hole or a shape.

According to certain embodiments, the input device 103 may include at least one microphone disposed on the second housing 120. In certain embodiments, the input device 103 may include a plurality of microphones disposed to detect the direction of a sound. In certain embodiments, a plurality of microphones may be disposed at appropriate positions in the first housing 110 and/or the second housing 120. According to an embodiment, the sound output devices 101 and 102 may include speakers. According to an embodiment, the input device 103 may include a receiver for calls disposed in the first housing 110, and a speaker disposed in the second housing 120. In certain embodiments, the input device 103, the sound output devices 101 and 102, and the connector port 107 may be disposed in a space arranged in the first housing 110 and/or the second housing 120 of the electronic device 100, and may be exposed to the external environment through at least one hole formed in the first housing 110 and/or the second housing 120. According to an embodiment, at least one connector port 107 may be used to transmit and receive power and/or data to and from an external electronic device. In certain embodiments, at least one connector port (e.g., ear jack hole) may accommodate a connector (e.g., ear jack) for transmitting and receiving an audio signal to and from an external electronic device. In certain embodiments, the hole formed in the first housing 110 and/or the second housing 120 may be commonly used for the input device 103 and the sound output devices 101 and 102. In certain embodiments, the sound output devices 101 and 102 may include a speaker (e.g., piezo speaker) that operates without using a hole formed in the first housing 110 and/or the second housing 120.

According to certain embodiments, the sensor module 104 may generate an electrical signal or data value corresponding to an internal operating state of the electronic device 100 or an external environmental state. The sensor module 104 may detect an external environment, for example, through the first surface 111 of the first housing 110. In certain embodiments, the electronic device 100 may further include at least one sensor module disposed to detect an external environment through the second surface 112 of the first housing 110. According to an embodiment, the sensor module 104 (e.g., illuminance sensor) may be disposed under the flexible display 400 to detect an external environment through the flexible display 400. According to an embodiment, the sensor module 104 may include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor 104.

According to certain embodiments, the camera devices 105 and 108 may include a first camera device 105 (e.g., front camera device) disposed on the first surface 111 of the first housing 110, and a second camera device 108 disposed on the second surface 112 of the first housing 110. The electronic device 100 may further include a flash 109 disposed close to the second camera device 108. According to an embodiment, the camera device 105 or 108 may include one or more lenses, an image sensor, and/or an image signal processor. The flash 109 may include, for example, a light emitting diode or a xenon lamp. According to an embodiment, the camera devices 105 and 108 may be arranged so that two or more lenses (e.g., wide-angle lens, super-wide-angle lens, or telephoto lens) and image sensors are positioned on one surface (e.g., first surface 111, second surface 112, third surface 121, or fourth surface 122) of the electronic device 100. In certain embodiments, the camera devices 105 and 108 may include time-of-flight (TOF) lenses and/or an image sensor.

According to certain embodiments, the key input device 106 (e.g., key button) may be disposed on the third side surface 113c of the first side member 113 of the first housing 110. In certain embodiments, the key input device 106 may be disposed on at least one of the other side surfaces 113a and 113b of the first housing 110 and/or the side surfaces 123a, 123b and 123c of the second housing 120. In certain embodiments, the electronic device 100 may not include some or all of the key input devices 106, and those not included key input devices 106 may be implemented in other forms, such as soft keys, on the flexible display 400. In certain embodiments, the key input device 106 may be implemented using a pressure sensor included in the flexible display 400.

According to certain embodiments, some of the camera devices 105 and 108 (e.g., first camera device 105) or the sensor module 104 may be disposed to be exposed through the flexible display 400. For example, the first camera device 105 or the sensor module 104 may be arranged in the internal space of the electronic device 100 so as to be in contact with the external environment through an opening (e.g., through hole) formed at least partially in the flexible display 400. In another embodiment, some sensor modules 104 may be arranged in the internal space of the electronic device 100 so as to perform their functions without being visually exposed through the flexible display 400. For example, in this case, the opening of a region of the flexible display 400 facing the sensor module may be not needed.

With reference to FIG. 2B, the electronic device 100 may be operated to remain in an intermediate state through the hinge mechanism (e.g., hinge device 140 in FIG. 1B). In this case, the electronic device 100 may control the flexible display 400 to display different pieces of content on the display area corresponding to the first surface 111 and the display area corresponding to the third surface 121. According to an embodiment, the electronic device 100 may be operated substantially in an unfolded state (e.g., unfolded state of FIG. 1A) and/or substantially in a folded state (e.g., folded state of FIG. 2A) with respect to a specific inflection angle (e.g., angle between the first housing 110 and the second housing 120 in the intermediate state) through the hinge mechanism (e.g., hinge mechanism 140 in FIG. 1B). For example, when a pressing force is applied in the unfolding direction (B direction) in a state where the electronic device 100 is unfolded at a specific inflection angle, through the hinge mechanism (e.g., hinge mechanism 140 in FIG. 1B), the electronic device 100 may be transitioned to an unfolded state (e.g., unfolded state of FIG. 1A). For example, when a pressing force is applied in the folding direction (C direction) in a state where the electronic device 100 is unfolded at a specific inflection angle, through the hinge mechanism (e.g., hinge mechanism 140 in FIG. 1B), the electronic device 100 may be transitioned to a closed state (e.g., folded state of FIG. 2A). In an embodiment, the electronic device 100 may be operated to remain in an unfolded state at various angles (not shown) through the hinge mechanism (e.g., hinge mechanism 140 in FIG. 1B).

FIGS. 1A, 1B, 1C, 2A and 2B illustrate an in-folding scheme in which the first surface 111 of the first housing 110 and the third surface 121 of the second housing 120 face substantially the same first direction (the z-axis direction) when the electronic device 100 is in a flat state or unfolding state, and in which the first surface 111 and the third surface 121 face each other when the electronic device 100 is in a folded state. According to an embodiment, there may be an out-folding scheme in which, the first surface 111 of the first housing 110 and the third surface 121 of the second housing 120 face substantially the same first direction (the z-axis direction) when the electronic device 100 is in a flat state or unfolding state and in which the second surface 112 and the fourth surface 122 face each other when the electronic device 100 is in a folded state.

Figure 3:
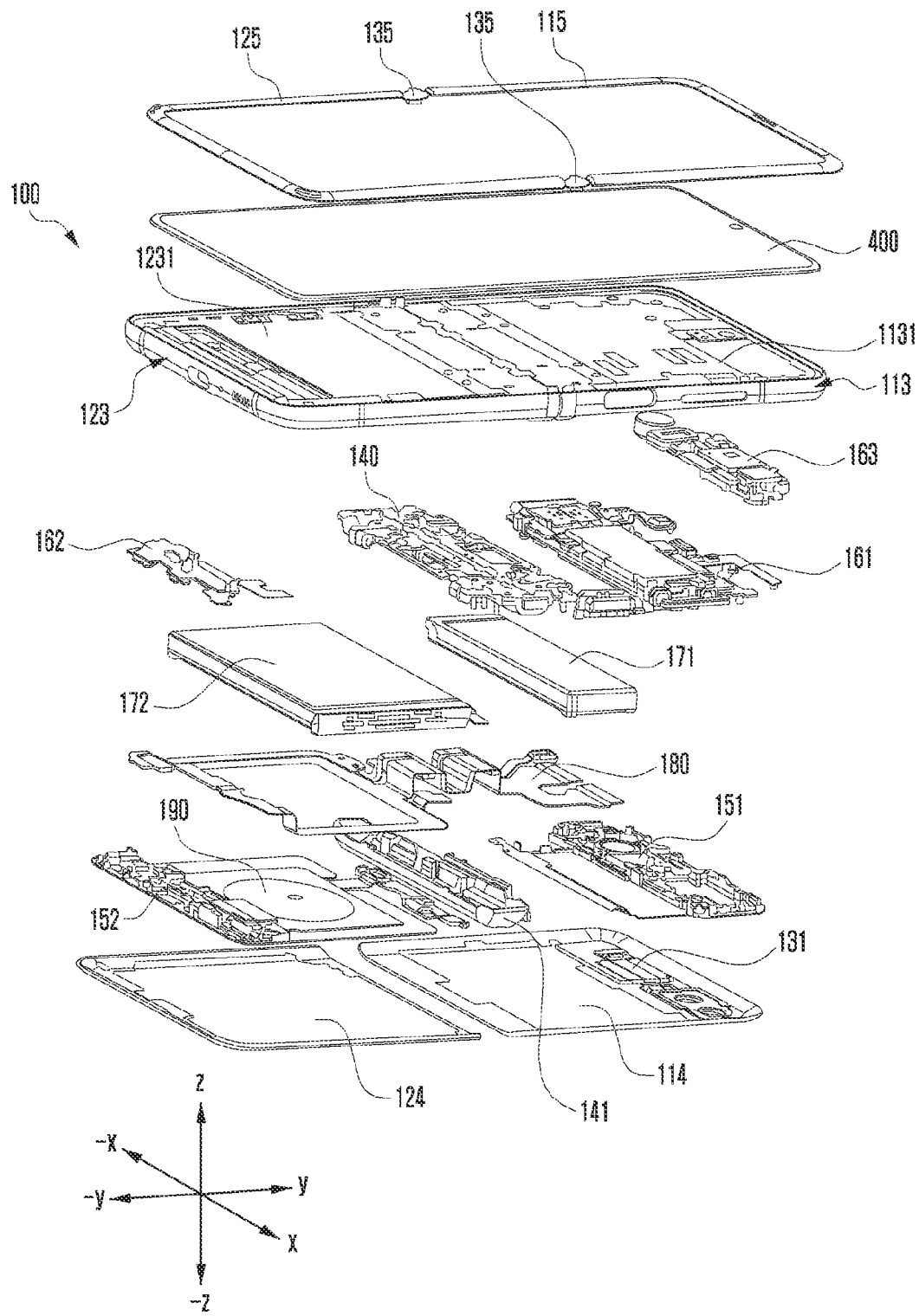
FIG. 3 is an exploded perspective view of an electronic device according to various embodiments.

FIG. 3 is an exploded perspective view of the electronic device according to various embodiments.

With reference to FIG. 3, the electronic device 100 may include a first side member 113 (e.g., first side frame), a second side member 123 (e.g., second side frame), and a hinge mechanism 140 (e.g., hinge module) rotatably connecting the first side member 113 and the second side member 123. According to an embodiment, the electronic device 100 may include a first support member 1131 (e.g., first support member) at least partially extending from the first side member 113, and a second support member 1231 at least partially extending from the second side member 123. According to an embodiment, the first support member 1131 may be integrally formed with the first side member 113 or may be structurally coupled to the first side member 113. Similarly, the second support member 1231 may be integrally formed with the second side member 123 or may be structurally coupled to the second side member 123. According to an embodiment, the electronic device 100 may include a flexible display 400 disposed to be supported by the first support member 1131 and the second support member 1231. According to an embodiment, the electronic device 100 may include a first rear cover 114 that is coupled to the first side member 113 and provides a first space between itself and the first support member 1131, and a second rear cover 124 that is coupled to the second side member 123 and provides a second space between itself and the second support member 1231. In certain embodiments, the first side member 113 and the first rear cover 114 may be integrally formed. In certain embodiments, the second side member 123 and the second rear cover 124 may be integrally formed. According to an embodiment, the electronic device 100 may include a first housing 110 (e.g., first housing 110 in FIG. 1A) (e.g., first housing structure) provided through the first side member 113, the first support member 1131, and the first rear cover 114. According to an embodiment, the electronic device 100 may include a second housing (e.g., second housing 120 in FIG. 1A) (e.g., second housing structure) provided through the second side member 123, the second support member 1231, and the second rear cover 124. According to an embodiment, the electronic device 100 may include a sub-display 131 that is disposed to be visible from the outside through at least some region of the first rear cover 114.

According to certain embodiments, the electronic device 100 may include a first substrate assembly 161 (e.g., main printed circuit board), a camera assembly 163, a first battery 171, or a first bracket 151, arranged in the first space between the first side member 113 and the first rear cover 114. According to an embodiment, the camera assembly 163 may include a plurality of camera devices (e.g., camera devices 105 and 108 in FIGS. 1A and 2A), and may be electrically connected to the first substrate assembly 161. According to an embodiment, the first bracket 151 may provide a support structure for supporting the first substrate assembly 161 and/or the camera assembly 163, and improved rigidity. According to an embodiment, the electronic device 100 may include a second board assembly 162 (e.g., sub printed circuit board), an antenna 190 (e.g., coil member), a second battery 172, or a second bracket 152, arranged in the second space between the second side member 123 and the second rear cover 124. According to an embodiment, the electronic device 100 may include a wiring member 180 (e.g., FPCB) extending from the first substrate assembly 161 across the hinge mechanism 140 to a plurality of electronic components arranged between the second side member 123 and the second rear cover 124, to provide electrical connections therebetween. According to an embodiment, the antenna 190 may include a near field communication (NFC) antenna, a wireless charging antenna, and/or a magnetic secure transmission (MST) antenna. The antenna 190 may, for example, perform short-range communication with an external device or wirelessly transmit and receive power utilized for charging.

According to certain embodiments, the electronic device 100 may include a hinge housing 141 (e.g., hinge cover) that supports the hinge mechanism 140 and is disposed so as to be exposed to the outside when the electronic device 100 is in the folded state (e.g., folded state of FIG. 2A) and be invisible from the outside by being retracted into the first space and/or the second space when the electronic device 100 is in the unfolded state (e.g., unfolded state of FIG. 1A).

According to certain embodiments, the electronic device 100 may include a first protection cover 115 coupled along the periphery of the first side member 113. According to an embodiment, the electronic device 100 may include a second protection cover 125 coupled along the periphery of the second side member 123. According to an embodiment, in the flexible display 400, the periphery of a first flat portion (e.g., first flat portion 130*a* in FIG. 1B) may be protected by the first protection cover 115. According to an embodiment, in the flexible display 400, the periphery of a second flat portion (e.g., second flat portion 130*b* in FIG. 1B) may be protected by the second protection cover 125. According to an embodiment, the electronic device 100 may include a protection cap 135 that protects the periphery of the third region (e.g., third region 130*c* in FIG. 1B) of the flexible display 400 corresponding to the hinge mechanism 140.

According to certain embodiments, the first support member 1131 may include a first support surface 1131*a* facing a first direction (z-axis direction), and a second support surface 1131*b* facing a second direction (negative z-axis direction) opposite to the first direction. According to an embodiment, the second support member 1231 may include a third support surface 1231*a* facing the first direction, and a fourth support surface 1231*b* facing the second direction in the unfolded state. According to an embodiment, the flexible display 400 may be supported by the first support surface 1131*a* of the first support member 1131 and the third support surface 1231*a* of the second support member 1231.

Figure 4:
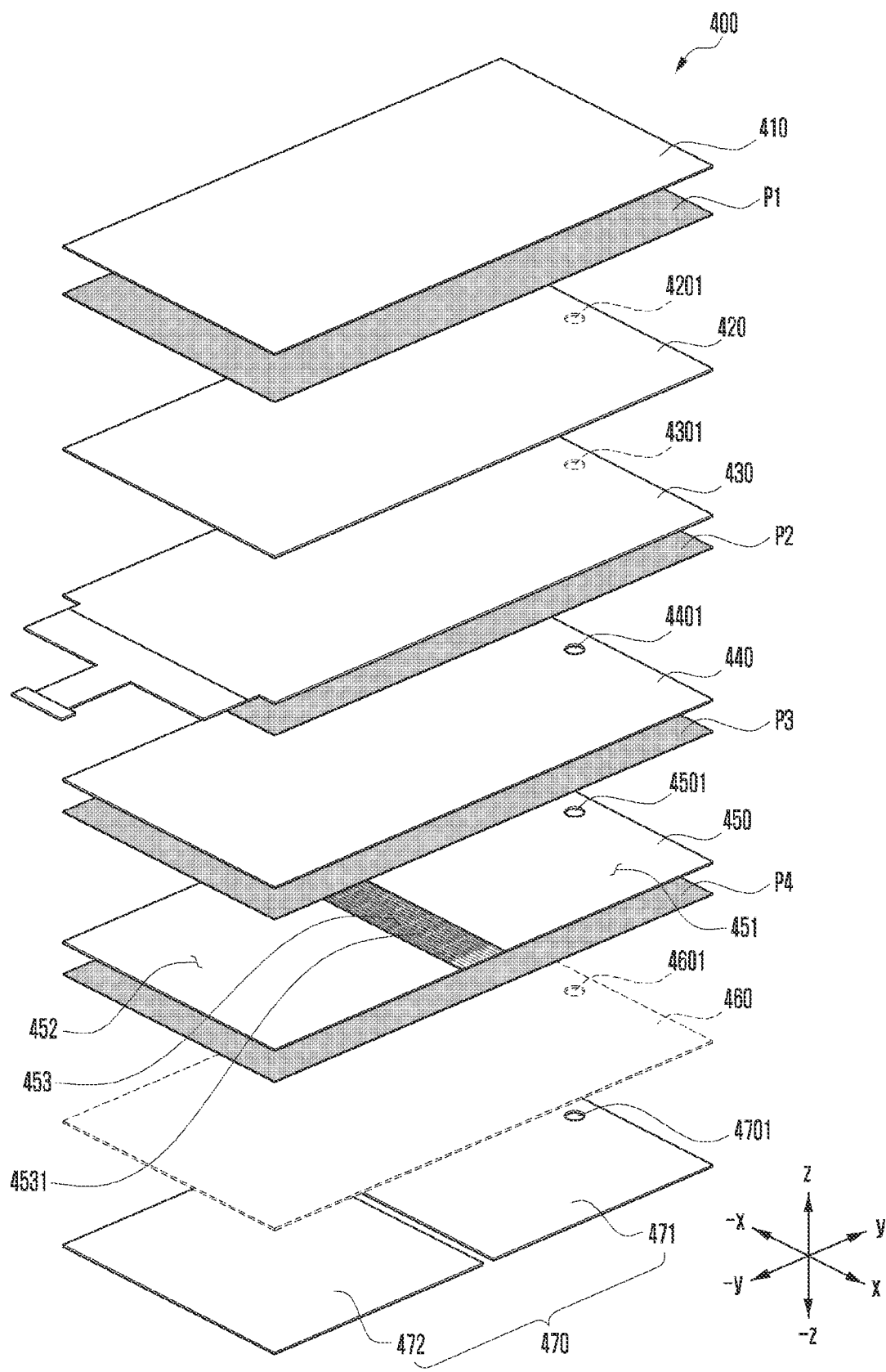
FIG. 4 is an exploded perspective view of a flexible display according to various embodiments.

FIG. 4 is an exploded perspective view of a flexible display according to various embodiments.

A flexible display 400 according to various embodiments of the disclosure may include, for example, and without limitation, an unbreakable (UB) type OLED display (e.g., a curved display).

Referring to FIG. 4, the flexible display 400 may include a window layer 410, and a polarizing layer (polarizer (POL)) 420 (e.g., a polarizing film), a display panel 430, a polymer layer 440, a metal sheet layer 450, and a reinforcing plate 470 which are sequentially disposed on a rear surface of the window layer 410. In various embodiments, the flexible display 400 may include a digitizer 460 disposed between the polymer layer 440 and the metal sheet layer 450 or between the metal sheet layer 450 and the reinforcing plate 470.

According to various embodiments, the window layer 410, the polarizing layer 420, the display panel 430, the polymer layer 440, and the metal sheet layer 450 may be disposed to cross at least a part of a first surface (e.g., the first surface 111 of FIG. 1A) of a first housing (e.g., the first housing 110 of FIG. 1A) and a third surface (e.g., the third surface 121 of FIG. 1A) of a second housing (e.g., the second housing 120 of FIG. 1A). According to an embodiment, the reinforcing plate 470 may include a first reinforcing plate 471 facing the first housing (e.g., the first housing 110 of FIG. 1A) and a second reinforcing plate 472 facing the second housing (e.g., the second housing 120 of FIG. 1A). According to an embodiment, the window layer 410, the polarizing layer 420, the display panel 430, the polymer layer 440, the metal sheet layer 450, and the reinforcing plate 470 may be attached to each other through adhesive agents P1, P2, P3, and P4 (or adhesives). For example, the adhesive agents P1, P2, P3, and P4 may include at least one of an optical clear adhesive (OCA), a pressure sensitive adhesive (PSA), a heat-reactive adhesive, a general adhesive, or a double-sided tape.

According to various embodiments, the display panel 430 may include a plurality of pixels and a wiring structure (e.g., an electrode pattern). According to an embodiment, the polarizing layer 420 may selectively pass light generated from a light source of the display panel 430 and vibrating in a predetermined direction. According to an embodiment, the display panel 430 and the polarizing layer 420 may be integrally configured. According to an embodiment, the flexible display 400 may include a touch panel (not shown).

According to various embodiments, the polymer layer 440 may be disposed under the display panel 430 to provide a dark background for securing visibility of the display panel 430, and may be formed of a buffer material for a buffering action. In various embodiments, for waterproofing of the flexible display 400, the polymer layer 440 may be removed or disposed under the metal sheet layer 450.

According to various embodiments, the metal sheet layer 450 may be configured to have a shape which provides flexibility to the flexible display 400. According to an embodiment, the metal sheet layer 450 may include at least one of steel use stainless (SUS) (e.g., stainless steel (STS)), Cu, Al, or a metal CLAD (e.g., a laminated member in which SUS and Al are alternately disposed). According to an embodiment, the metal sheet layer 450 may include a first plane portion 451 corresponding to the first housing (e.g., the first housing 110 of FIG. 1A), a second plane portion 452 corresponding to the second housing (e.g., the second housing 120 of FIG. 1A), and a bending portion 453 (a flexible portion or bending portion) connecting the first plane portion 451 and the second plane portion 452. According to an embodiment, the bending portion 453 may include a plurality of openings 4531 arranged at a predetermined (e.g., specified) interval. According to an embodiment, the bending characteristics of the bending portion 453 may be determined through at least one of a size, a shape, or an arrangement density of at least a part of the plurality of openings 4531. In various embodiments, the metal sheet layer 450 may include other alloy materials. In various embodiments, the metal sheet layer 450 may help to reinforce the stiffness of an electronic device (e.g., the electronic device 100 of FIG. 1A), and may be used to shield ambient noise and dissipate heat emitted from a surrounding heat emission component. In various embodiments, the metal sheet layer 450 may be replaced with a non-metal sheet material such as fiber reinforced plastics (FRP) (e.g., carbon fiber reinforced plastics (CFRP) or glass fiber reinforced plastics (GFRP)) having rigid properties for supporting the display panel 430.

According to various embodiments, the flexible display 400 may include the digitizer 460 as a detection member which is disposed under the metal sheet layer 450 and receives an input of an electronic pen (e.g., a stylus). For example, the digitizer 460 may include a coil member disposed on a dielectric substrate to detect a resonance frequency of an electromagnetic induction scheme applied from the electronic pen.

According to various embodiments, the flexible display 400 may include at least one functional member (not shown) disposed between the polymer layer 440 and the metal sheet layer 450 or disposed under the metal sheet layer 450. According to an embodiment, the functional member may include a graphite sheet for heat dissipation, an added display, a force touch FPCB, a fingerprint sensor FPCB, an antenna radiator for communication, or a conductive/non-conductive tape. According to an embodiment, when bending is impossible, the functional member may be separately disposed in the first housing (e.g., the first housing 110 of FIG. 1A) and the second housing (e.g., the second housing 120 of FIG. 1A). According to an embodiment, when bending is possible, the functional member may be disposed from the first housing (e.g., the first housing 110 of FIG. 1A)

to at least a part of the second housing (e.g., the second housing 120 of FIG. 1A) through a hinge device (e.g., the hinge device 140 of FIG. 1B).

According to various embodiments, the electronic device (e.g., the electronic device 100 of FIG. 1A) may be disposed under the flexible display 400 and may include a camera device (e.g., the first camera device 105 of FIG. 1A) configured to detect an external environment through the flexible display 400. In various embodiments, the electronic device (e.g., the electronic device 100 of FIG. 1A) may include at least one sensor module (e.g., the sensor module 104 of FIG. 1A) (e.g., an illuminance sensor, a proximity sensor, or a TOF sensor) disposed under the flexible display 400. According to an embodiment, the polarizing layer 420, the display panel 430, the polymer layer 440, the metal sheet layer 450, the digitizer 460, and the reinforcing plate 470 may include through-holes 4201, 4301, 4401, 4501, 4601, and 4701. In various embodiments, the display panel 430 and/or the polarizing layer 420 may not need the through-holes 4201 and 4301 by adjusting the transmittance of a corresponding region. In various embodiments, the sizes of the through-holes 4201, 4301, 4401, 4501, 4601, and 4701 may be configured based on the size of the camera device (e.g., the first camera device 105 of FIG. 1A) and/or an angle of view of the camera device (e.g., the first camera device 105 of FIG. 1A), and the through-holes 4201, 4301, 4401, 4501, 4601, and 4701 may have different sizes.

Figure 5B:
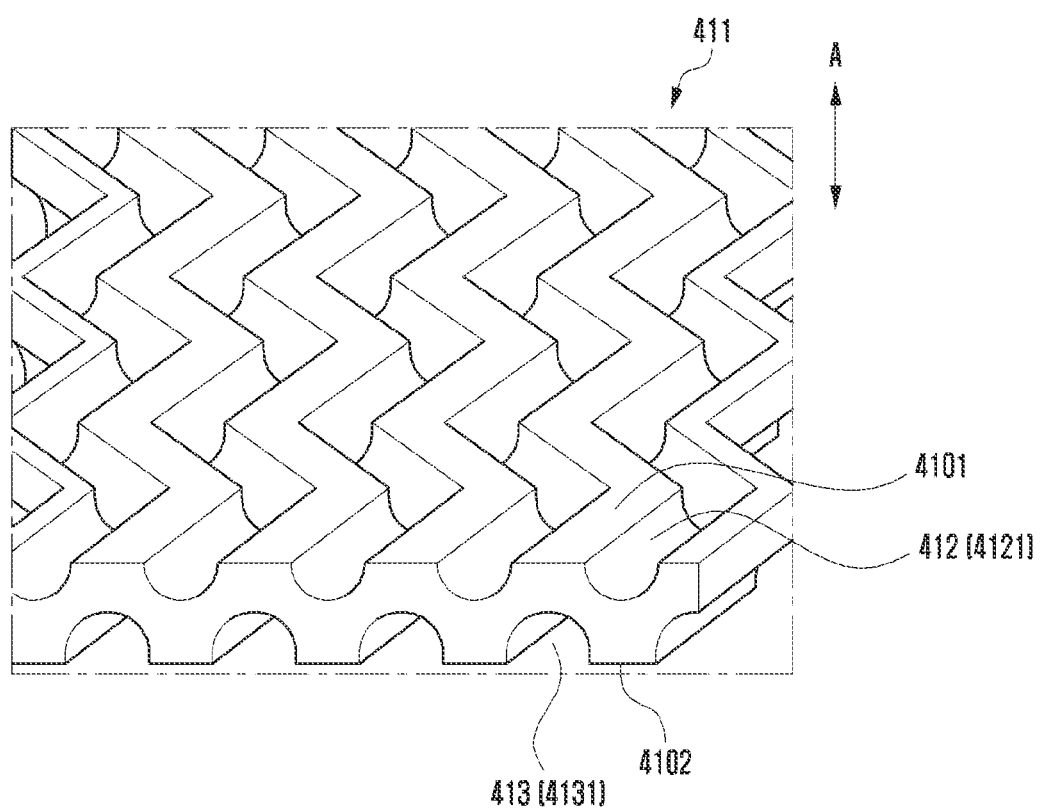
FIG. 5B is an enlarged perspective view illustrating a region of FIG. 5A according to various embodiments.
Figure 5C:
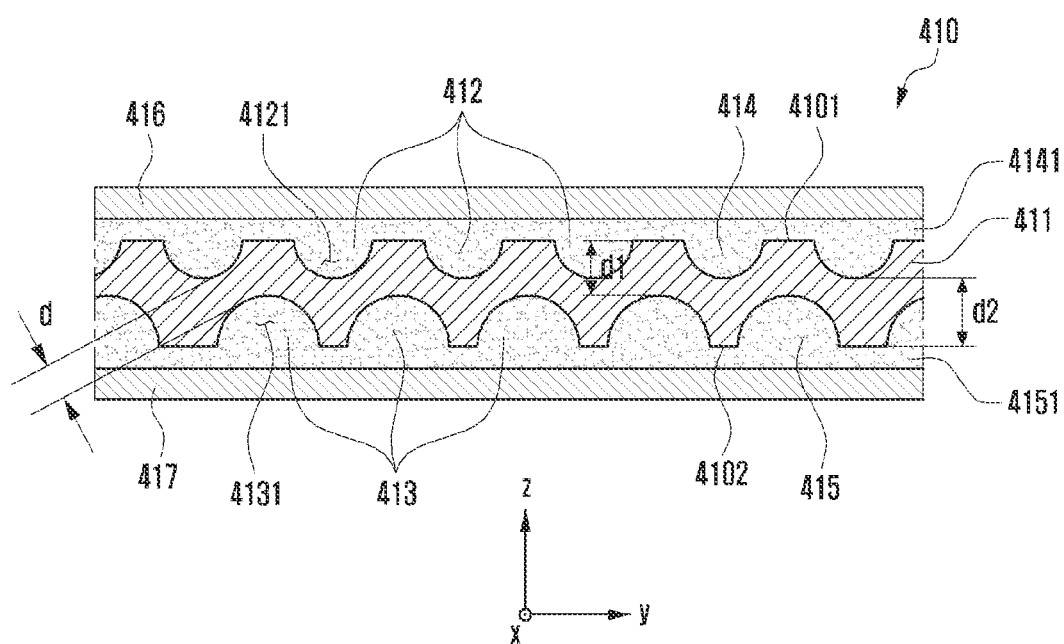
FIG. 5C is a partial cross-sectional view of a window layer taken along line 5c-5c of FIG. 5A according to various embodiments.

According to various embodiments, the window layer 410 may include a glass layer (e.g., a glass layer 411 of FIG. 5C). According to an embodiment, the glass layer (e.g., the glass layer 411 of FIG. 5C) may include a plurality of patterns (e.g., a plurality of patterns 412 and 413 of FIG. 5C) disposed in a region corresponding to a third bendable portion (e.g., the third portion 130c of FIG. 1B) of the flexible display 400 and configured to be lower than the outer surface of the glass layer (e.g., the glass layer 411 of FIG. 5C), and thus help to improve flexibility of the flexible display 400. According to an embodiment, an etching amount is differently configured for each region in the plurality of patterns (e.g., the plurality of patterns 412 and 413 of FIG. 5C), thereby helping to provide efficient flexibility corresponding to the folding or bending characteristics of the flexible display.

Hereinafter, the window layer 410 will be described in greater detail.

FIG. 5A is a diagram illustrating the window layer according to various embodiments. FIG. 5B is an enlarged perspective view illustrating a region 5b of FIG. 5A according to various embodiments. FIG. 5C is a partial cross-sectional view of the window layer viewed along line 5c-5c of FIG. 5A according to various embodiments.

Referring to FIGS. 5A, 5B and 5C, the window layer 410 may include a first region 410a corresponding to a first housing (e.g., the first housing 110 of FIG. 1A) of an electronic device (e.g., the electronic device 100 of FIG. 1A), a second region 410b corresponding to a second housing (e.g., the second housing 120 of FIG. 1A), and a third region 410c corresponding to a hinge device (e.g., the hinge device 140 of FIG. 1B). According to an embodiment, the third region 410c may be deformed to be bendable together with a display panel (e.g., the display panel 430 of FIG. 4) according to a folding operation of the electronic device (e.g., the electronic device 100 of FIG. 1A) with reference to a folding axis A.

According to various embodiments, the window layer 410 may include a glass layer 411 including a first surface 4101 facing an outward direction of the electronic device (e.g., the electronic device 100 of FIG. 1A), and a second surface 4102 facing a direction of the display panel (e.g., the display panel 430 of FIG. 4) which is opposite to the first surface 4101. According to an embodiment, the glass layer 411 may be formed by processing or etching a glass base material (e.g., a glass base material 411' of FIG. 7B) having a thickness in the range of, for example, 100 μm to 500 μm, and thus help to reinforce the stiffness of a flexible display (e.g., the flexible display 400 of FIG. 4). According to an embodiment, the thickness of the glass layer 411 may range from, for example, about 50 μm to about 300 μm. For example, the glass layer 411 may be configured such that a vertical distance from the first surface 4101 to the second surface 4102 has a thickness in the range of, for example, about 50 μm to 300 μm. In various embodiments, the glass layer 411 may be configured to have a thickness of, for example, about 200 μm.

According to various embodiments, the window layer 410 may include at least one protective layer 416 laminated on the first surface 4101 of the glass layer 411, and an impact absorbing layer 417 laminated on the second surface 4102. According to an embodiment, the at least one protective layer 416 may include a polymer layer laminated on the first surface 4101. According to an embodiment, the protective layer 416 may be formed of PET or PI. In various embodiments, the protective layer 416 may include an additional glass layer (e.g., ultra thin glass, UTG) laminated on the first surface 4101, and a polymer layer laminated on the additional glass layer. According to an embodiment, the impact absorbing layer 417 may be formed of PET as another polymer layer. In various embodiments, the impact absorbing layer 417 may be replaced with the protective layer 416.

According to various embodiments, the glass layer 411 may include, on the first surface 4101, a plurality of first patterns 412 configured to be lower than the first surface 4101 and spaced apart from each other at a predetermined interval. According to an embodiment, the glass layer 411 may include, on the second surface 4102, a plurality of second patterns 413 configured to be lower than the second surface 4102 and spaced apart from each other at a predetermined interval. According to an embodiment, the plurality of first patterns 412 and the plurality of second patterns 413 may be disposed in regions corresponding to the first region 410a, the second region 410b, and the third region 410c of the window layer 410 in the glass layer 411. According to an embodiment, the plurality of first patterns 412 and the plurality of second patterns 413 may be formed through a process such as etching or laser. According to an embodiment, the plurality of first patterns 412 and the plurality of second patterns 413 may be configured to have lengths in a first direction (e.g., a −x-axis direction) parallel to the folding axis A. In various embodiments, the plurality of first patterns 412 and the plurality of second patterns 413 may be configured to have lengths in a direction not parallel to the folding axis A. According to an embodiment, each of the plurality of first patterns 412 and the plurality of second patterns 413 may be configured to have a straight line shape, a curved shape, a mixed shape of a straight line and a curved line, or a zigzag shape in which straight lines and/or curved lines extend alternately in opposite directions at specified lengths. According to an embodiment, as shown, the plurality of first patterns 412 and the plurality of second patterns 413 may be generally configured to have a hemispherical cross section, but are not limited thereto, and may be configured to have, for example, a rectangular, oval, or polygonal cross section. According to an embodiment, the plurality of first patterns 412 may be configured through first grooves 4121 configured to be lower (e.g., deeper) than the first surface 4101. According to an embodiment, the plurality of second patterns 413 may be configured through second grooves 4131 configured to be lower (e.g., deeper) than the second surface 4102. According to an embodiment, the plurality of first patterns 412 may be configured such that a shortest distance d2 from the first grooves 4121 to the second surface 4102 has a range of, for example, about 10 µm to 100 µm. According to an embodiment, the shortest distance d2 from the first grooves 4121 to the second surface 4102 may be formed to have a depth of, for example, at least 30 µm, and thus help to secure the stiffness of the glass layer 411. According to an embodiment, the plurality of second patterns 413 may be configured such that a shortest distance d1 from the second grooves 4131 to the first surface 4101 has a range of, for example, about 10 µm to 100 µm. According to an embodiment, the shortest distance d1 from the second grooves 4131 to the first surface 4101 may be formed to have a depth of, for example, at least 30 µm, and thus help to secure the stiffness of the glass layer 411. According to an embodiment, the plurality of first patterns 412 and the plurality of second patterns 413 may be configured such that a shortest distance d between at least one pattern among the plurality of first patterns 412 and at least one pattern adjacent thereto among the plurality of second patterns 413 has a range of, for example, about 10 µm to 100 µm. According to an embodiment, the shortest distance d between at least one pattern among the plurality of first patterns 412 and at least one pattern adjacent thereto among the plurality of second patterns 413 may be configured to be, for example, at least 30 µm, and thus help to secure the stiffness of the glass layer 411.

According to various embodiments, the feature in which the glass layer 411 includes, on the first surface 4101, the plurality of first patterns 412 configured to be lower than the first surface 4101 may refer, for example, to the plurality of first patterns 412 being disposed at a position in the opposite direction (a −Z-axis direction) of a direction in which the first surface 4101 faces. According to various embodiments, the feature in which the glass layer 411 includes, on the second surface 4102, the plurality of second patterns 413 configured to be lower than the second surface 4102 may refer, for example, to the plurality of second patterns 413 being disposed at a position in the opposite direction (an Z-axis direction) of a direction in which the second surface 4102 faces.

According to various embodiments, the glass layer 411 may include only one plurality of patterns between the plurality of first patterns 412 formed on the first surface 4101 and/or the plurality of second patterns 413 formed on the second surface 4102. For example, the glass layer 411 may include only the plurality of first patterns 412. For another example, the glass layer may include only the plurality of second patterns 413.

According to various embodiments, the window layer 410 may include filling members 414 and 415 filled in the plurality of first patterns 412 and the plurality of second patterns 413. For example, the filling members 414 and 415 may include a first filling member 414 filled in the plurality of first patterns 412 and a second filling member 415 filled in the plurality of second patterns 413. According to an embodiment, the first filling member 414 and the second filling member 415 may include substantially the same material. In various embodiments, the first filling member 414 and the second filling member 415 may include different materials. According to an embodiment, the filling members 414 and 415 may include a material having elasticity.

According to an embodiment, the filling members 414 and 415, as a substantially transparent material, may include a material which is filled in the grooves 4121 and 4131 of the plurality of patterns 412 and 413 in an initial liquid or semi-solid form, and then cured through time elapsing, irradiation with light, or chemical treatment. According to an embodiment, the filling members 414 and 415 may include a resin such as silicone, urethane, or acrylic. According to an embodiment, the filling members 414 and 415 may include a material having substantially the same refractive index as that of the glass layer 411, and thus induce the plurality of patterns 412 and 413 to be visually invisible from the outside. In various embodiments, the filling members 414 and 415 disposed at positions corresponding to the first region 410a and the second region 410b of the window layer 410 and the filling members 414 and 415 disposed in a region corresponding to the third region 410c may include different materials. For example, since the filling members 414 and 415 applied to the plurality of patterns 412 and 413 disposed at a position corresponding to the third region 410c of the window layer 410, which are required to have high flexibility, have a large pattern change rate, a medium having a relatively high elastic modulus may be used.

According to various embodiments, the window layer 410 may include a first planarization layer 4141 laminated on the first surface 4101 of the glass layer 411, and a second planarization layer 4151 laminated on the second surface 4102 of the glass layer 411. According to an embodiment, the first planarization layer 4141 may be disposed between the first surface 4101 of the glass layer 411 and the protective layer 416. According to an embodiment, the second planarization layer 4151 may be disposed between the second surface 4102 of the glass layer 411 and the impact absorbing layer 417. In various embodiments, the first planarization layer 4141 and/or the second planarization layer 4151 may be omitted. According to an embodiment, the first planarization layer 4141 and the second planarization layer 4151 may induce the roughened first surface 4101 and the second surface 4102 of the glass layer 411 to have substantially flat surfaces, by the filling members 414 and 415 filled in the plurality of patterns 412 and 413, and may be disposed to protect the glass layer 411. According to an embodiment, the first planarization layer 4141 and the second planarization layer 4151 may be formed of the same material as the filling members 414 and 415. In this case, the first planarization layer 4141 and the second planarization layer 4151 may be formed together when the filling members 414 and 415 are filled. In various embodiments, the first planarization layer 4141 and the second planarization layer 4151 may be formed of a material different from the filling members 414 and 415. According to an embodiment, the first planarization layer 4141 and the second planarization layer 4151 may be formed to have a thickness in a range of, for example, 10 µm to 100 µm. For example, the first planarization layer 4141 and the second planarization layer 4151 may be formed to have a thickness of, for example, about 10 µm.

According to various embodiments, the bending characteristics in at least the third region 410c of the window layer 410 may be determined through a difference in etching amounts per unit area of the plurality of first patterns 412 and the plurality of second patterns 413 disposed on the glass layer 411. For example, the electronic device 100 shown in FIGS. 1A to 2B may be operated in an in-folding manner in which parts of the flexible display 400 are folded to face each other in a folding state. In this case, the glass layer 411 may be configured, at a position corresponding to at least the third region 410c of the window layer 410, in a manner in which an etching amount per unit area of the plurality of second patterns 413 disposed on the second surface 4102 is formed to be larger than an etching amount per unit area of the plurality of first patterns 412 disposed on the first surface 4101, and thus may help to improve the flexibility of the window layer 410. In various embodiments, the bending characteristics of the glass layer 411, at a position corresponding to at least the third region 410c of the window layer 410, may be determined through arrangement densities of the plurality of first and second patterns 412 and 413 having substantially the same shape. In this case, the number of the plurality of first patterns 412 per unit area may be less than the number of the plurality of second patterns 413 per unit area.

According to various embodiments, the glass layer 411 may include the plurality of patterns 412 and 413 formed in substantially the same manner not only in the third region 410c of the window layer 410 but also in parts corresponding to the first region 410a and the second region 410b, so that a phenomenon in which only the third region 410c is visually recognized from the outside may be reduced. In addition, the glass layer 411 may be formed to have a relatively thick thickness that is advantageous for stiffness reinforcement, while providing improved bending characteristics to a part corresponding to at least the third region 410c of the window layer 410 through the plurality of patterns 412 and 413.

Figure 5D:
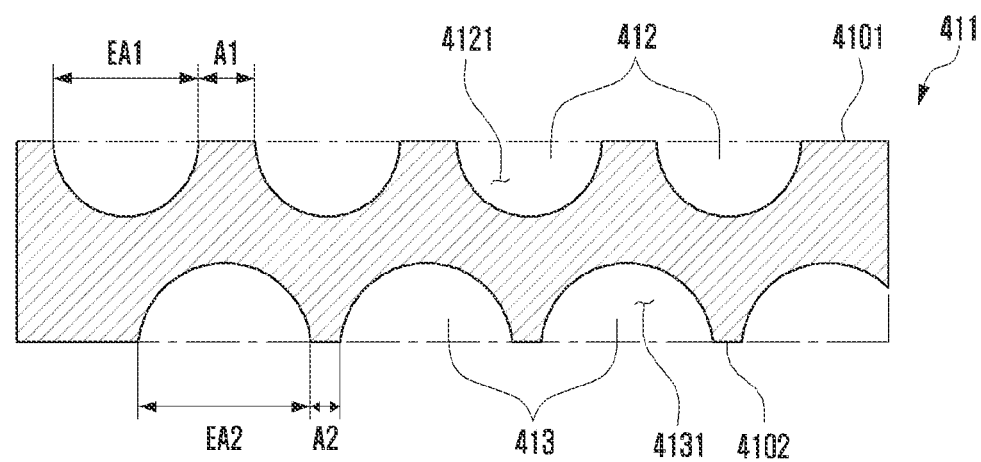
FIG. 5D is a partial cross-sectional view of a glass layer, according to various embodiments.

FIG. 5D is a partial cross-sectional view of the glass layer, according to various embodiments.

In describing the glass layer 411 of FIG. 5D, components substantially the same as or similar to those of the glass layer 411 of FIG. 5C are given the same reference numerals, and a detailed description thereof may be omitted.

Referring to FIG. 5D, the glass layer 411 may include the plurality of first patterns 412 formed on the first surface 4101 to be lower than the first surface 4101 and arranged at a predetermined interval, and the plurality of second patterns 413 formed on the second surface 4102 to be lower than the second surface 4102 and arranged at a predetermined interval. According to an embodiment, the glass layer 411 may include first etched portions EA1 (e.g., first etched portions) formed on the first surface 4101 through the plurality of first patterns 412 and having a first area, and first non-etched portions A1 (e.g., first non-etched portions) which are not etched. According to an embodiment, the glass layer 411 may include second etched portions EA2 (e.g., second etched portions) formed on the second surface 4102 through the plurality of second patterns 413 and having a second area, and second non-etched portions A2 (e.g., second non-etched portions) which are not etched. According to an embodiment, in the case of being applied to an electronic device (e.g., the electronic device 100 of FIG. 1A) operating in an in-folding manner, the glass layer 411 may be configured such that the first area of the first etched portions EA1 is smaller than the second area of the second etched portions EA2. In various embodiments, the area of the first non-etched portions A1 may be configured to be larger than the area of the second non-etched portions A2. For example, the pressure-resistant properties of the glass layer 411 may be improved as an area ratio of the first etched portions EA1/first non-etched portions A1 of the first surface 4101 decreases, and the bending characteristics of the glass layer may be improved as an area ratio of the second etched portions EA2/second non-etched portions A2 of the second surface 4102 increases. Accordingly, the glass layer 411 may help to improve the pressure-resistant properties of the first surface 4101 with which an electronic pen is in contact, and to improve the bending characteristics of the second surface 4102 according to a folding operation.

Figure 6A:
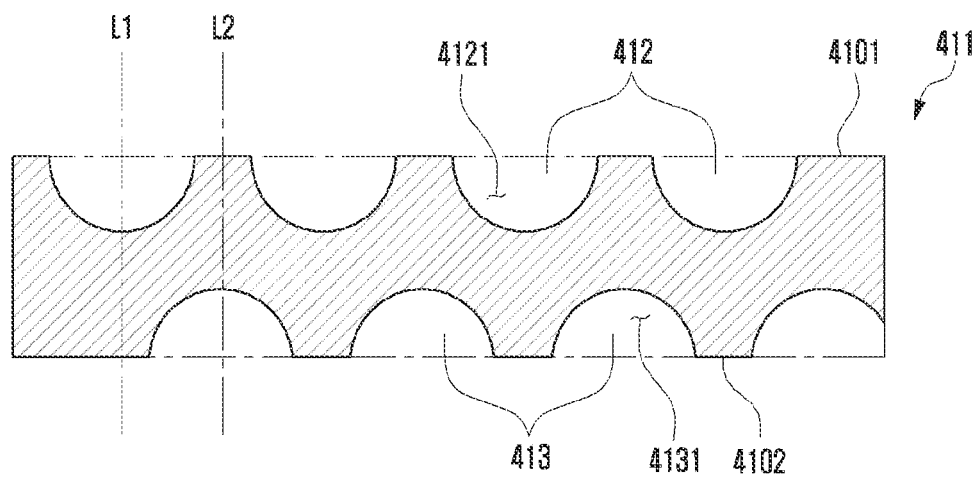
FIGS. 6A, 6B and 6C are partial cross-sectional views of a glass layer illustrating a shape and an arrangement structure of a plurality of patterns according to various embodiments.
Figure 6B:
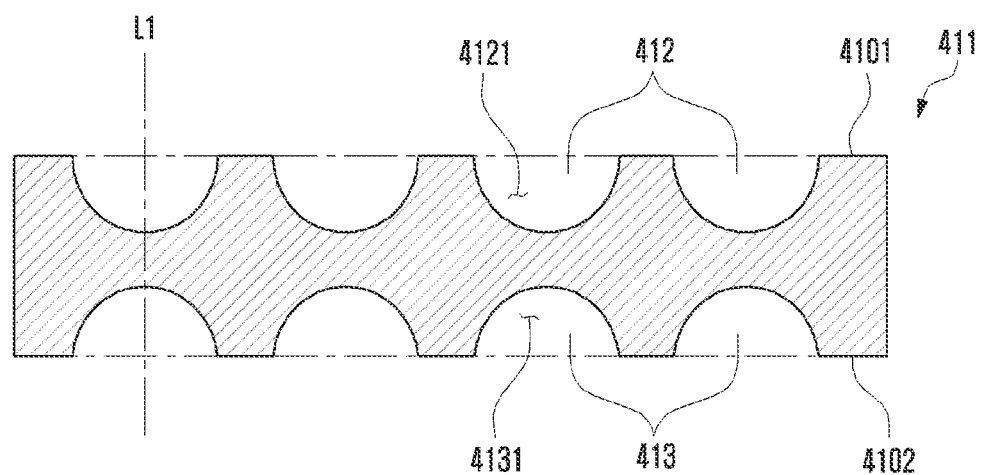
Figure 6C:
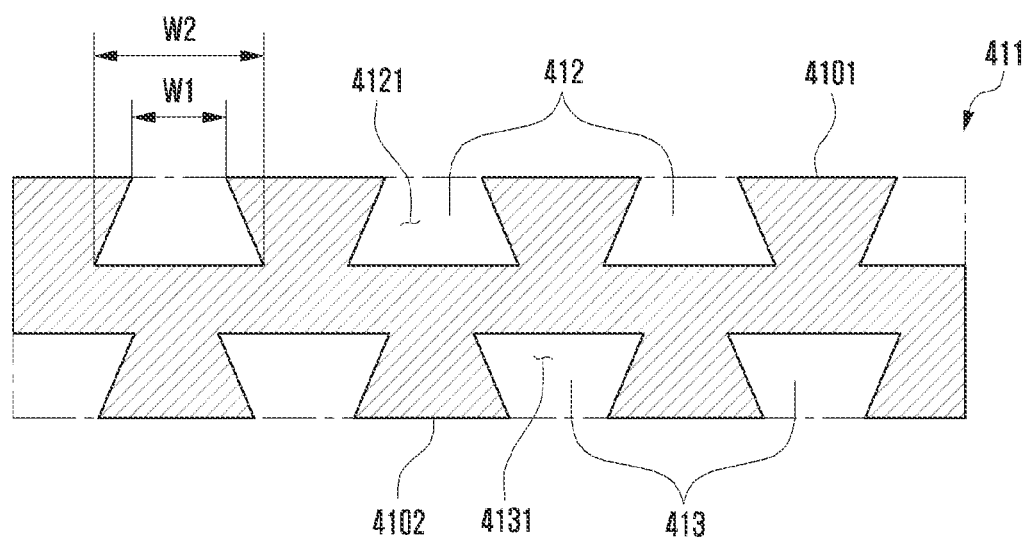

FIGS. 6A, 6B and 6C are partial cross-sectional views of the glass layer illustrating a shape and an arrangement structure of the plurality of patterns according to various embodiments.

Referring to FIG. 6A, the glass layer 411 may include the plurality of first patterns 412 disposed on the first surface 4101 and the plurality of second patterns 413 disposed on the second surface 4102. According to an embodiment, the plurality of first patterns 412 and the plurality of second patterns 413 may be disposed in a manner in which a first virtual line L1 passing through the center of each of the plurality of first patterns 412 does not coincide with a second virtual line L2 passing through the center of each of the plurality of second patterns 413. In this case, a staggered (e.g., at least partially non-overlapping) arrangement structure of the plurality of first patterns 412 and the plurality of second patterns 413 may help to improve the stiffness of the glass layer 411.

Referring to FIG. 6B, the glass layer 411 may include the plurality of first patterns 412 disposed on the first surface 4101 and the plurality of second patterns 413 disposed on the second surface 4102. According to an embodiment, the virtual line passing through the center of each of the plurality of second patterns 413 may be disposed in a manner consistent with the virtual line L1 passing through the center of each of the plurality of first patterns 412. In this case, a matched (e.g., overlapping) arrangement structure of the plurality of first patterns 412 and the plurality of second patterns 413 may help to improve the flexibility of the glass layer 411. In various embodiments, the glass layer 411 may include the plurality of patterns 412 and 413 in which the configuration of FIG. 6A and the configuration of FIG. 6B are mixed, in a region corresponding to at least the third region 410c of the window layer 410, and thus may be advantageous to respond to the bending characteristics of each sub-region of the third region 410c of the window layer 410. For example, in the corresponding part of the glass layer 411 corresponding to the third region 410c of the window layer 410, the configuration of FIG. 6B may be applied to a first sub-region requiring the greatest flexibility, and the configuration of FIG. 6A may be applied to second and third sub-regions extending to both side surfaces of the first sub-region and requiring relatively small flexibility.

Referring to FIG. 6C, the glass layer 411 may include the plurality of first patterns 412 disposed on the first surface 4101 and the plurality of second patterns 413 disposed on the second surface 4102. According to an embodiment, each of the plurality of first patterns 412 may include the first groove 4121 having a predetermined depth and formed to be lower than the first surface 4101. According to an embodiment, the first groove 4121 may be configured in a manner in which an etching area of the first groove increases as it progresses from the first surface 4101 to the second surface 4102. For example, the first groove 4121 may include an introduction portion having a first width W1 and formed on the first surface 4101 and an internal space having a second width W2 wider than the introduction portion. According to an embodiment, the first groove 4121 may be formed through an isotropic etching process. According to an embodiment, the second groove 4131 included in each of the plurality of second patterns 413 may also be formed in substantially the same manner as the first groove 4121. According to an embodiment, the glass layer 411 formed through the first and second patterns 412 and 413 including the grooves 4121 and 4131 having such a shape may help to improve the flexibility through an increase in the amount of etching, and the first surface 4101 and the second surface 4102 have relatively large areas, so that the stiffness (e.g., pressure-resistant properties) of the glass layer may be improved. For example, the glass layer 411 having high stiffness compared to improved flexibility may help to improve the use convenience of an electronic pen operated in a manner that the same is in contact with the first surface.

Figure 7A:
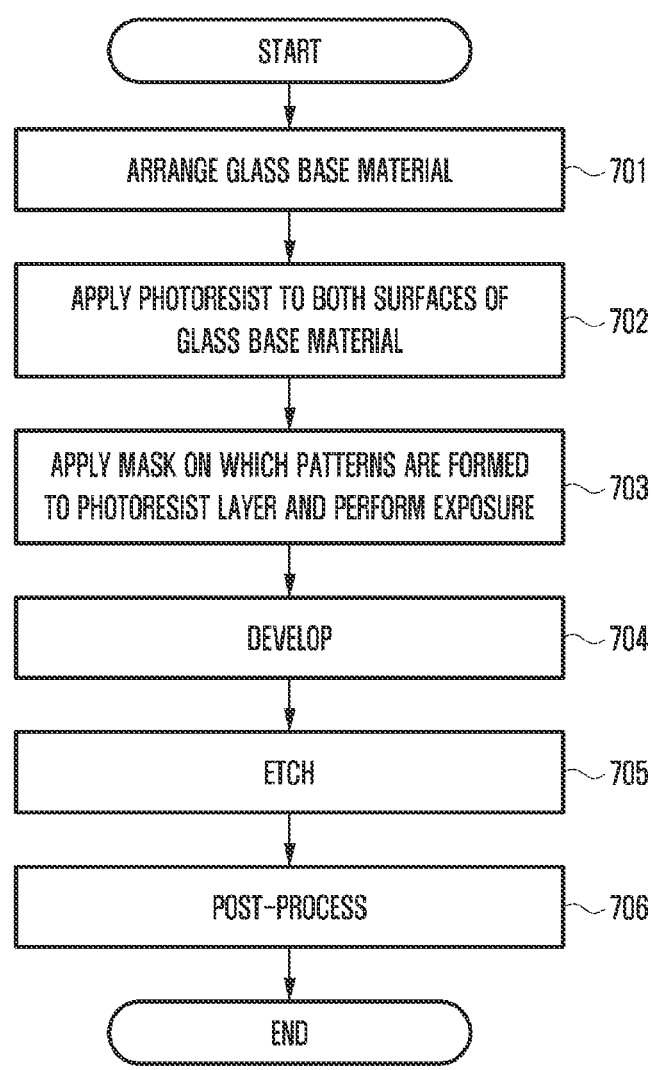
FIG. 7A is a flowchart illustrating an example manufacturing process of a window layer according to various embodiments.
Figure 7B:
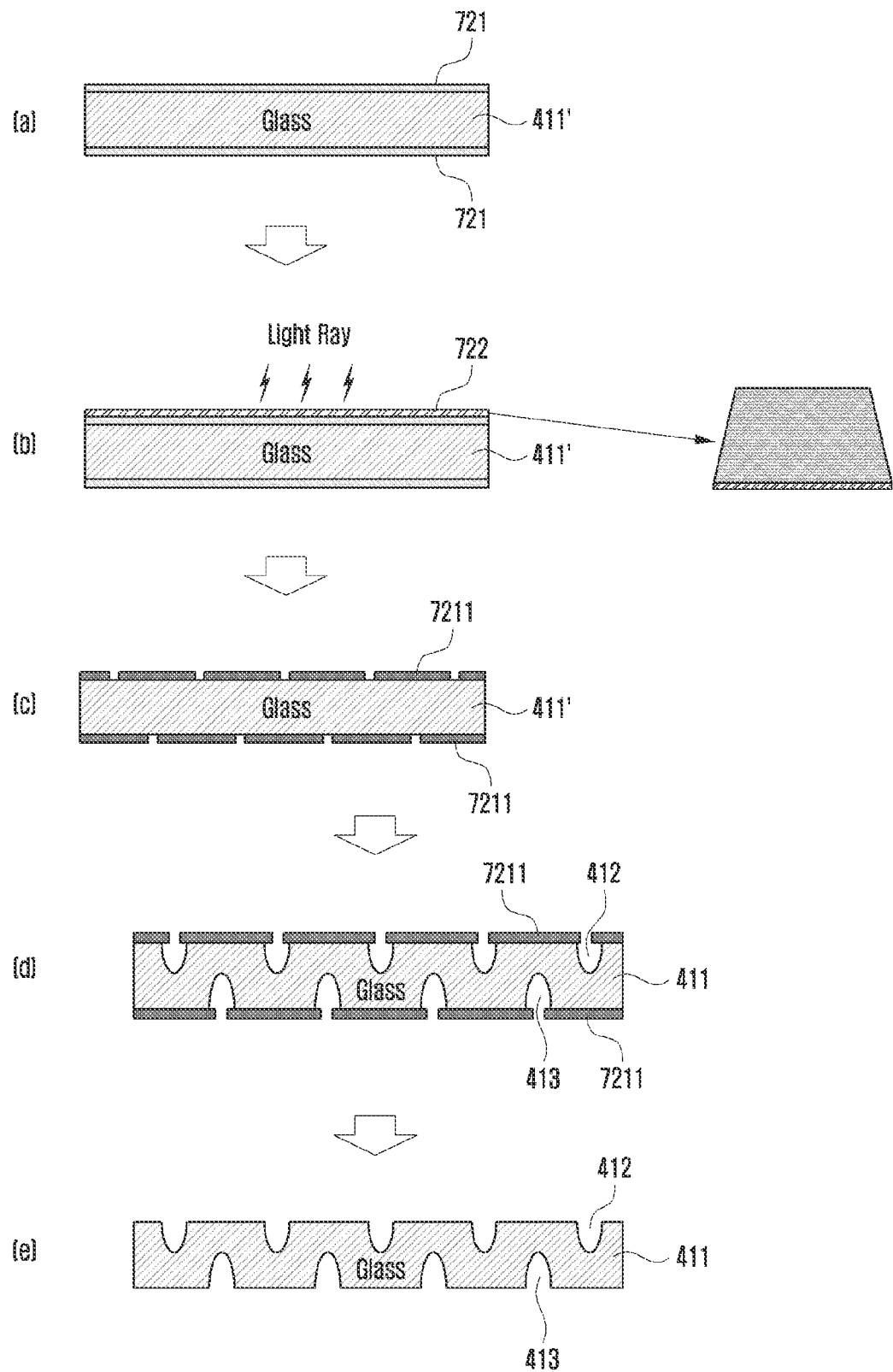
FIG. 7B is a diagram illustrating an example process for manufacturing a window layer according to various embodiments.

FIG. 7A is a flowchart illustrating an example manufacturing process of the window layer according to various embodiments. FIG. 7B is a diagram illustrating an example process for manufacturing the window layer according to various embodiments.

Referring to FIGS. 7A and 7B, in operation 701, a glass base material 411' may be arranged. According to an embodiment, the glass base material 411' may protect a display and may be configured to have a thickness having pressure-resistant properties according to a contact with an external electronic device (e.g., an electronic pen). For example, the thickness of the glass base material 411' may have a range of about 100 μm to 500 μm.

According to various embodiments, in operation 702, a photoresist layer 721 may be disposed on each of both surfaces of the glass base material 411' as shown in case (a) of FIG. 7B. For example, the photoresist layers 721 may be formed in such a manner in which a photoresist is applied or coated. For example, the photoresist may include a resin which undergoes a chemical change when irradiated with light of a specific wavelength, and may cause a change of dissolution and solidification in response to specific light, from ultraviolet to visible wavelengths. In various embodiments, after the photoresist is applied, a soft bake process may be performed on the glass base material 411' at a specified temperature.

According to various embodiments, in operation 703, as shown in case (b) of FIG. 7B, after a masking member 722 is laminated on the upper surface of the photoresist layer 721 formed on the glass base material 411', an exposure process in which light of a specific wavelength (e.g., ultraviolet light) is radiated may be performed. According to an embodiment, the masking member 722 may include patterns having shapes corresponding to the plurality of first patterns 412 and the plurality of second patterns 413 to be formed on the glass layer 411. Accordingly, through the exposure process, a part of the photoresist layer 721 corresponding to the plurality of first and second patterns 412 and 413 and any one of the other parts thereof may be exposed through light.

According to various embodiments, in operation 704, as shown in case (c) of FIG. 7B, the masking member 722 may be removed, and an exposed photoresist layer 7211 may be developed through a developing solution. For example, a corresponding region of the exposed photoresist layer 7211 corresponding to the plurality of first and second patterns exposed to light through the masking member 722 is removed, so that the outer surface of the glass base material 411' may be exposed.

According to various embodiments, in operation 705, as shown in case (d) of FIG. 7B, the glass base material 411' from which at least a part of the partially exposed photoresist layer 7211 is removed may be formed as the glass layer 411 having the plurality of first patterns 412 and the plurality of second patterns 413 including grooves having a specified depth and area from the outer surface of the glass base material 411', through etching. For example, the plurality of first patterns 412 and the plurality of second patterns 413 may be formed through isotropic etching or anisotropic etching.

According to various embodiments, in operation 706, as shown in case (e) of FIG. 7B, a residual photoresist layer 7211 applied to the outer surface of the glass layer 411 through a post-processing process may be removed, and a filling member (e.g., the filling members 414 and 415 of FIG. 5C) and a protective layer (e.g., the protective layer 416 or the impact absorbing layer 417 of FIG. 5C) may be additionally laminated thereon.

Figure 8B:
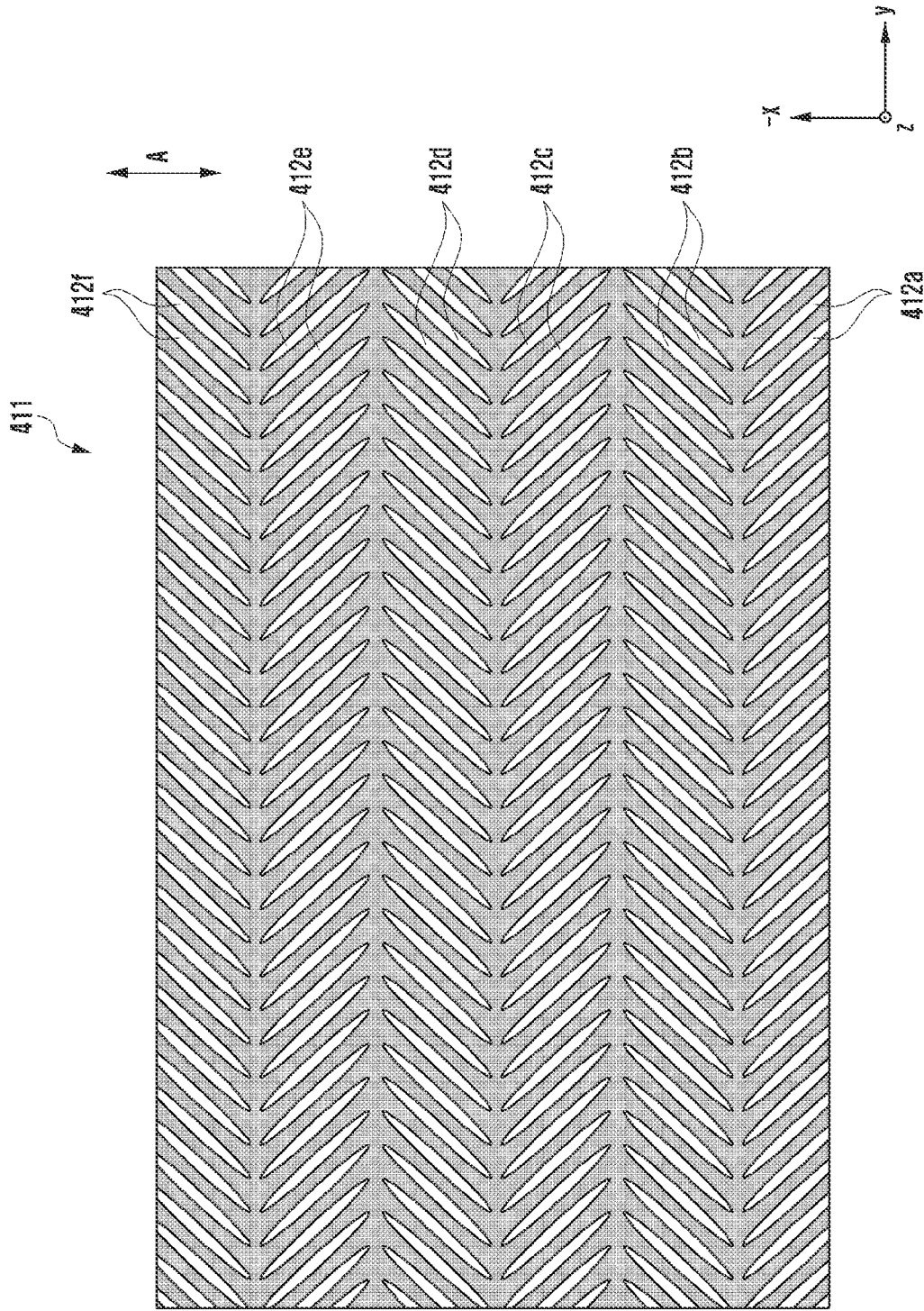

FIGS. 8A and 8B are diagrams illustrating example views of the glass layer including the plurality of patterns according to various embodiments.

Referring to FIG. 8A, the plurality of first patterns 412 formed on the glass layer 411 may be formed to have a length in a direction parallel to the folding axis A through the grooves 4121, so as to improve the flexibility. For example, the plurality of first patterns 412 may be configured to have a zigzag shape bent by alternating opposite directions at a specified angle for each length specified in a straight line shape. In various embodiments, in a similar manner, the plurality of first patterns 412 may be configured to have a curved shape or a mixed shape of a straight line and a curved line. According to an embodiment, although not shown, a plurality of second patterns (e.g., the plurality of second patterns 413 of FIG. 5C) formed on a second surface (e.g., the second surface 4102 of FIG. 5C) of the glass layer 411 may also be configured in substantially the same manner.

Referring to FIG. 8B, the plurality of first patterns 412 formed on the glass layer 411 may include a plurality of sub-patterns 412a, 412b, 412c, 412d, 412e, and 412f which are arranged along a direction parallel to the folding axis A. According to an embodiment, the plurality of sub-patterns 412a, 412b, 412c, 412d, 412e, and 412f may be formed to have a specified length and to be inclined at a specified angle. For example, the plurality of sub-patterns 412a, 412b, 412c, 412d, 412e, and 412f may be alternately formed to be inclined at angles indirections opposite to each other. In various embodiments, the plurality of sub-patterns 412a, 412b, 412c, 412d, 412e, and 412f may also be configured to have a straight line shape of a direction parallel to the folding axis A. According to an embodiment, although not shown, a plurality of second patterns (e.g., the plurality of second patterns 413 of FIG. 5C) formed on a second surface (e.g., the second surface 4102 of FIG. 5C) of the glass layer 411 may also be configured in substantially the same manner.

Figure 9A:
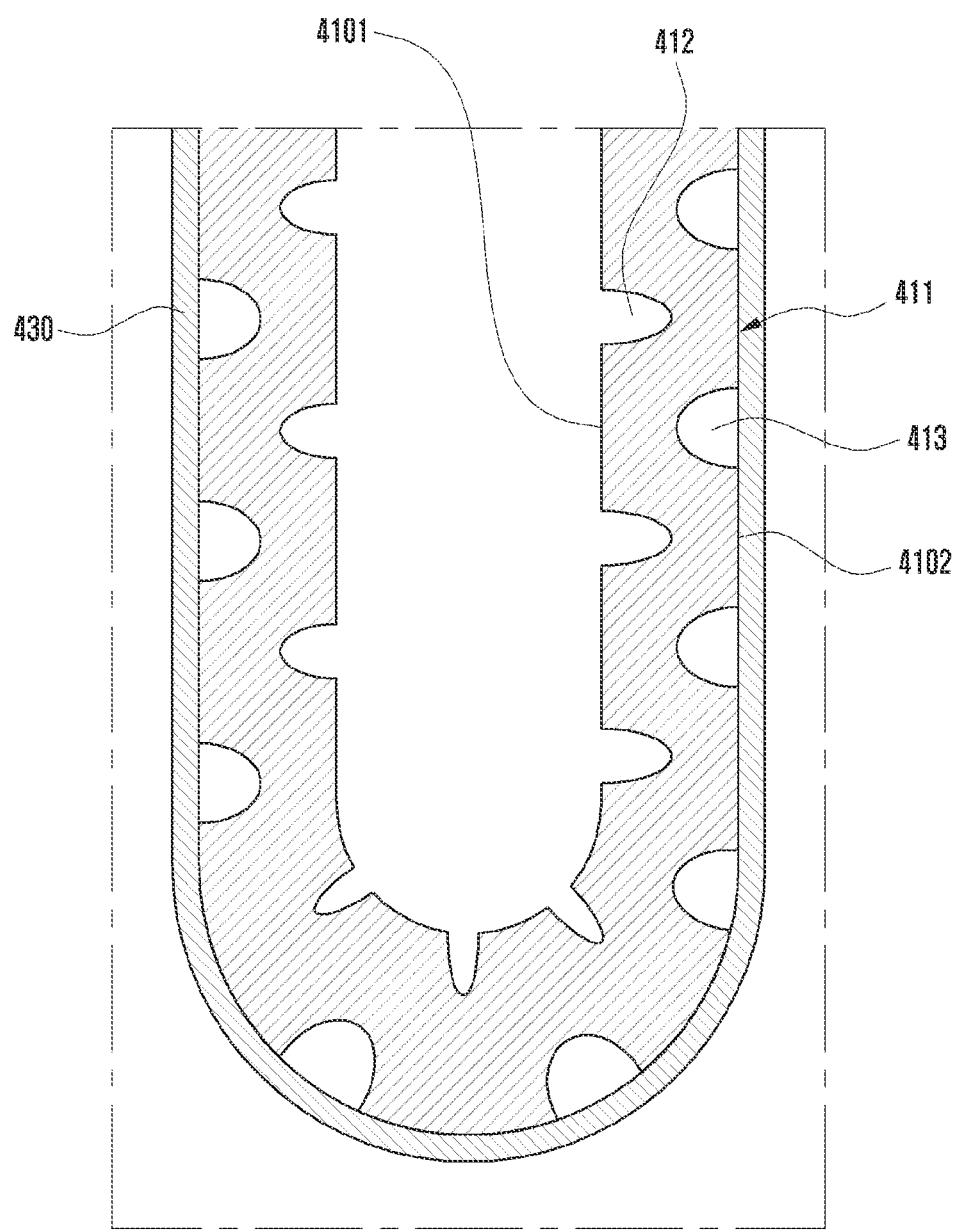
FIGS. 9A and 9B are cross-sectional views illustrating a shape and an arrangement configuration of a plurality of patterns according to a bending direction of a display panel according to various embodiments.
Figure 9B:
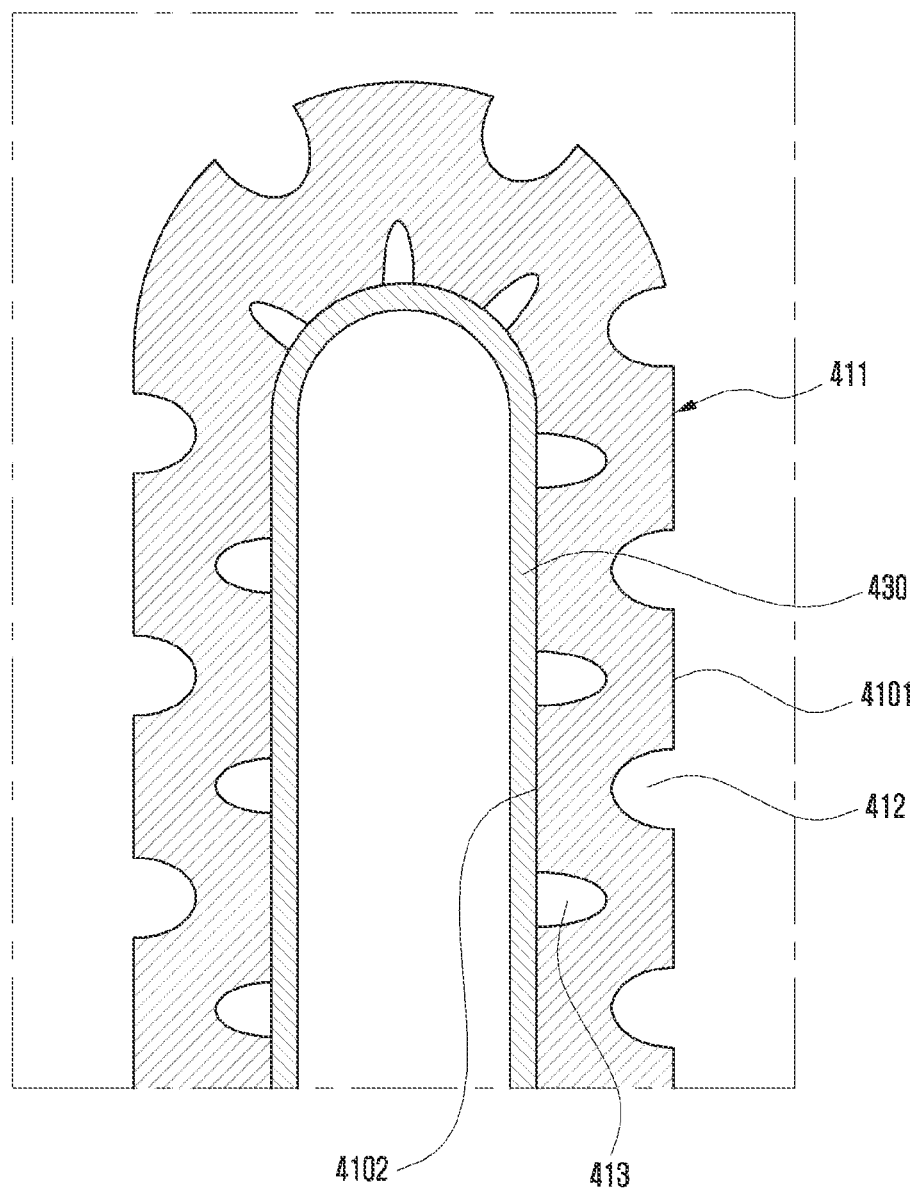

FIGS. 9A and 9B are partial cross-sectional views illustrating a shape and an arrangement configuration of the plurality of patterns according to a bending direction of the display panel according to various embodiments.

Referring to FIGS. 9A and 9B, the glass layer 411 may include the first surface 4101 and the second surface 4102 facing in a direction opposite to the first surface 4101 and corresponding to the display panel 430. According to an embodiment, the glass layer 411 may include, on the first surface 4101, the plurality of first patterns 412 configured at a predetermined interval to be lower than the first surface 4101. According to an embodiment, the glass layer 411 may include, on the second surface 4102, the plurality of second patterns 413 configured at a predetermined interval to be lower than the second surface 4102.

According to various embodiments, an etching amount per unit area of the plurality of first patterns 412 and an etching amount per unit area of the plurality of second patterns 413 may be configured differently according to a folding manner of an electronic device. According to an embodiment, the etching amount per unit area may be determined through an etching depth, an etching interval, or an etching area of the patterns 412 and 413. For example, as shown in FIG. 9A, in an in-folding manner in which the display panel 430 is folded to face each other, the glass layer 411 may be configured such that the etching amount per unit area of the plurality of second patterns 413 disposed on the second surface 4102 is larger than the etching amount per unit area of the plurality of first patterns 412 disposed on the first surface 4101, and thus help to improve the flexibility. In addition, as shown in FIG. 9B, in an out-folding manner in which the display panel 430 is folded to face in opposite directions, the glass layer 411 may be configured such that the etching amount per unit area of the plurality of second patterns 413 disposed on the second surface 4102 is less than the etching amount per unit area of the plurality of first patterns 412 disposed on the first surface 4101, and thus help to improve the flexibility. For example, in the glass layer 411, the etching amount per unit area of the plurality of patterns 412 and 413 formed on a front surface (e.g., the first surface 4101 of FIG. 5C) and a rear surface (e.g., the second surface 4102 of FIG. 5C) of the glass layer 411 is appropriately configured according to a bending manner of the electronic device, and thus help to improve the flexibility.

According to various embodiments, the glass layer 411 may be configured such that a shortest distance from the first surface 4101 to the second surface 4102 may, for example, be at most 300 μm or less. According to an embodiment, the glass layer 411 may be configured such that a shortest distance (e.g., the shortest distance d2 of FIG. 5C) from each of the plurality of first patterns 412 to the second surface 4102, a shortest distance (e.g., the shortest distance d1 of FIG. 5C) from each of the plurality of second patterns 413 to the first surface 4101, or a shortest distance (e.g., the shortest distance d of FIG. 5C) between each of the plurality of first patterns 412 and each of the plurality of second patterns 413 adjacent thereto has a range of, for example, about 50 μm to 150 μm.

Figure 10:
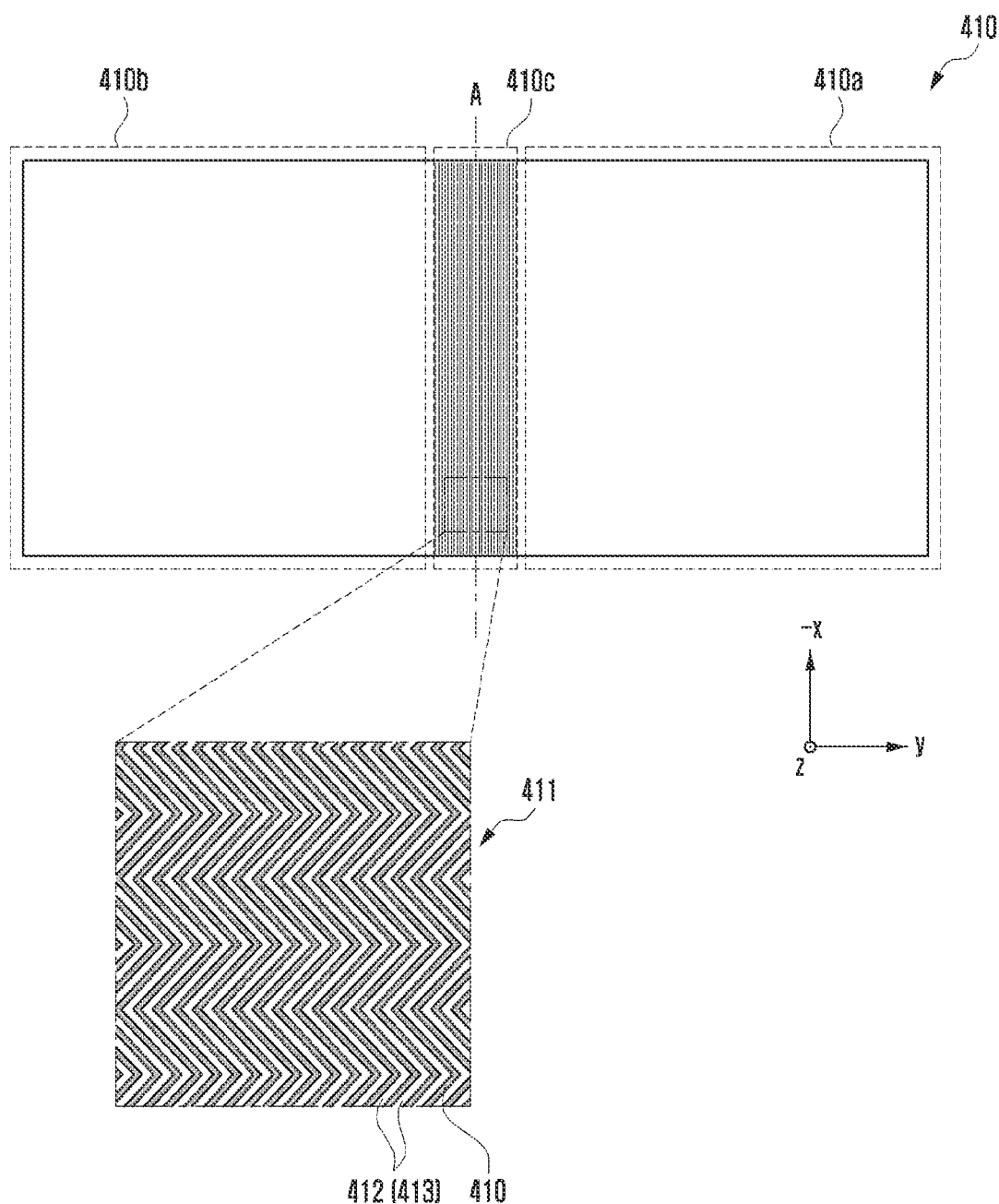
FIG. 10 is a diagram illustrating a window layer according to various embodiments.

FIG. 10 is a diagram illustrating an example window layer according to various embodiments.

In describing the window layer 410 of FIG. 10, components substantially the same as or similar to those of the window layer 410 of FIG. 5A are given the same reference numerals, and a detailed description thereof may not be repeated.

Referring to FIG. 10, the window layer 410 may include the first region 410a corresponding to a first housing (e.g., the first housing 110 of FIG. 1A) of an electronic device (e.g., the electronic device 100 of FIG. 1A), the second region 410b corresponding to a second housing (e.g., the second housing 120 of FIG. 1A), and the third region 410c corresponding to a hinge device (e.g., the hinge device 140 of FIG. 1B). According to an embodiment, the third region 410c may be deformed to be bendable together with a display panel (e.g., the display panel 430 of FIG. 4) according to a folding operation of the electronic device (e.g., the electronic device 100 of FIG. 1A) with reference to the folding axis A.

According to various embodiments, the window layer 410 may include the glass layer 411 disposed in a part corresponding to the third region 410c and including the plurality of first patterns 412 and the plurality of second patterns 413 disposed on a front surface (e.g., the first surface 4101 of FIG. 5C) and a rear surface (e.g., the second surface 4102 of FIG. 5C), respectively, so as to help to improve the flexibility of the window layer 410. According to an embodiment, in the glass layer 411, the plurality of patterns 412 and 413 may be omitted in a part corresponding to the first region 410a of the window layer 410 and in a part corresponding to the second region 410b, thereby helping to reinforce the stiffness of the window layer 410.

Figure 11A:
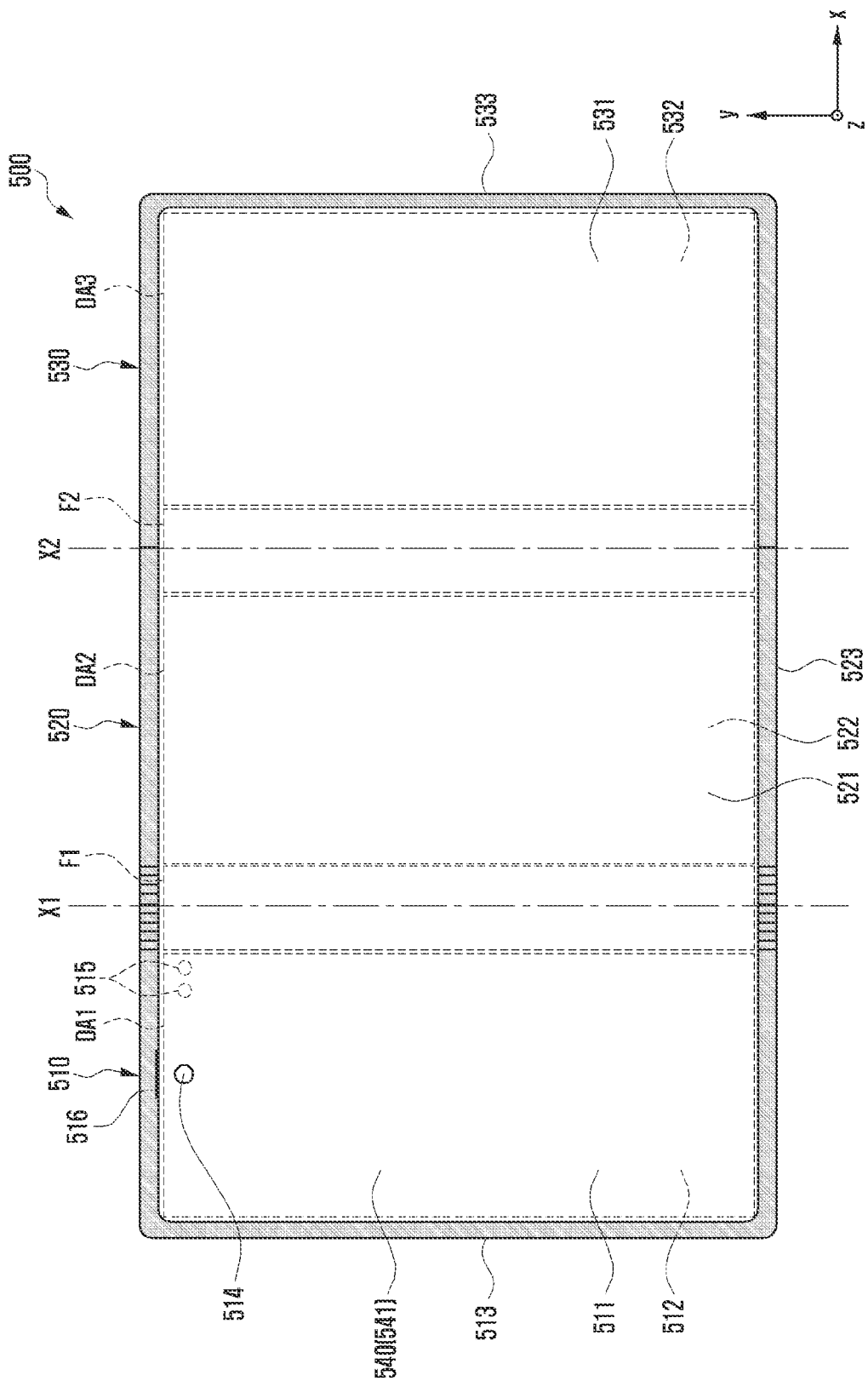
FIG. 11A is a diagram illustrating an electronic device, in an unfolded state according to various embodiments.
Figure 11B:
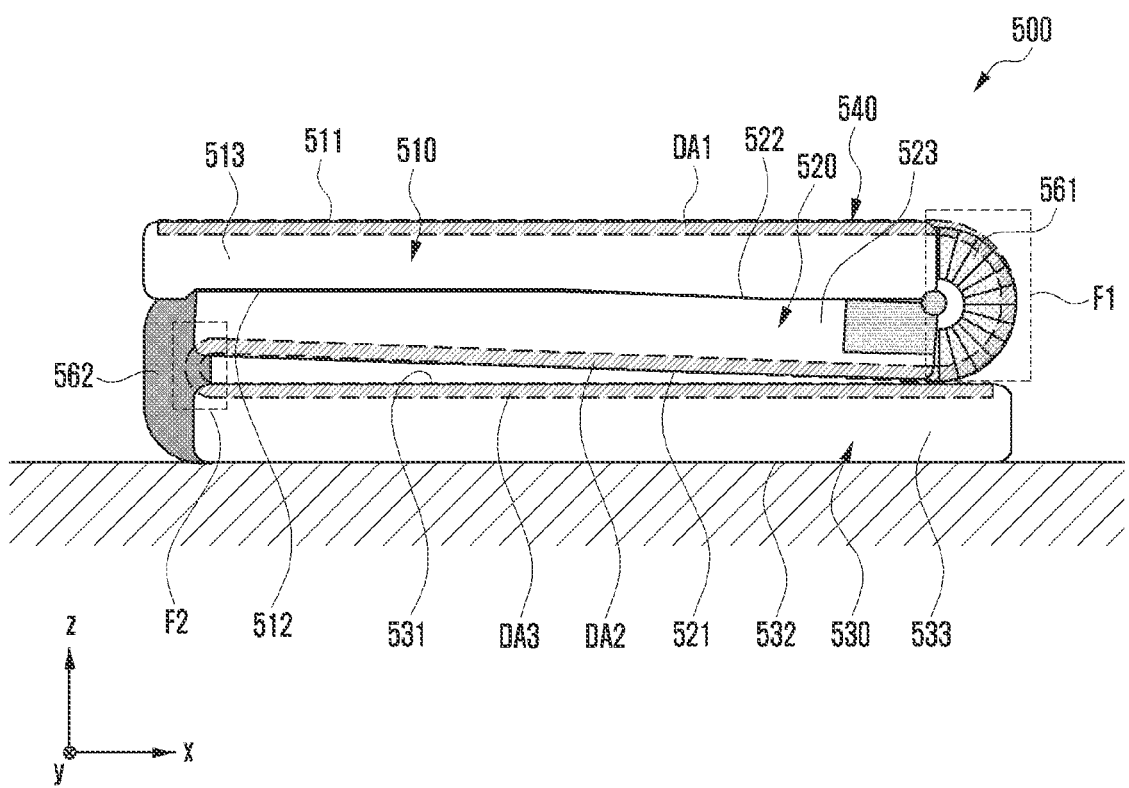
FIG. 11B is a sectional view illustrating an electronic device of FIG. 11A in a folded state according to various embodiments.

FIG. 11A is a diagram illustrating an electronic device, in an unfolded state according to various embodiments. FIG. 11B is a diagram illustrating the electronic device, in a folded state of FIG. 11A according to various embodiments.

Referring to FIGS. 11A and 11B, an electronic device 500 may include a first housing 510, a second housing 520, and a third housing 530 which are rotatably disposed with respect to each other. According to an embodiment, the electronic device 500 may include a flexible display 540 disposed to be supported by the first housing 510, the second housing 520, and the third housing 530. According to an embodiment, the first housing 510 and the second housing 520 may be rotatably connected to each other with reference to a first folding axis X1 through a first hinge device 561. According to an embodiment, the second housing 520 and the third housing 530 may be rotatably connected to each other with reference to a second folding axis X2 through a second hinge device 562. According to an embodiment, the first housing 510 and the second housing 520 may be operated in a first folding manner (e.g., an out-folding manner) through the first hinge device 561. For example, in a folding state, the first housing 510 and the second housing 520 may be disposed to face opposite directions such that display regions facing the housings 510 and 520, respectively, can be seen from the outside.

According to various embodiments, the second housing 520 and the third housing 530 may be operated in a second folding manner (e.g., an in-folding manner) through the second hinge device 562. For example, in a folding state, the second housing 520 and the third housing 530 may be arranged such that display regions facing the housings 520 and 530, respectively, face each other. According to an embodiment, the electronic device 500 may operate in a state in which the first housing 510, the second housing 520, and the third housing 530 are fully unfolded. According to an embodiment, the electronic device 500 may operate in a state in which only the first housing 510 and the second housing 520 are folded. According to an embodiment, the electronic device 500 may operate in a state in which all of the first housing 510, the second housing 520, and the third housing 530 are folded. According to an embodiment, a display region facing the first housing 510 may be disposed toward the outside of the electronic device 500 to be visible to a user in a fully folded state. In this case, a camera module 514 and a sensor module 515 may be disposed to detect an external environment through a display region corresponding to the first housing 510. In various embodiments, the camera module 514 and/or the sensor module 515 may be disposed under the flexible display 540 to be invisible from the outside.

According to various embodiments, the first housing 510 may include a first surface 511, a second surface 512 facing in a direction opposite to the first surface 511, and a first side surface member 513 surrounding the space between the first surface 511 and the second surface 512. According to an embodiment, the second housing 520 may include a third surface 521, a fourth surface 522 facing in a direction opposite to the third surface 521, and a second side surface member 523 surrounding the space between the third surface 521 and the fourth surface 522. According to an embodiment, the third housing 530 may include a fifth surface 531, a sixth surface 532 facing in a direction opposite to the fifth surface 531, and a third side surface member 533 surrounding the space between the fifth surface 531 and the sixth surface 532. According to an embodiment, the flexible display 540 may be disposed to be supported by the first surface 511, the third surface 521, and the fifth surface 531.

According to various embodiments, the flexible display 540 may include a glass layer 541 (e.g., the glass layer 411 of FIG. 5C) which protects a display panel (e.g., the display panel 430 of FIG. 5C) and is laminated thereon to provide the flexibility. According to an embodiment, the glass layer 541 may include a first region DA1 facing the first housing 510, a second region DA2 facing the second housing 520, and a third region DA3 facing the third housing 530. According to an embodiment, the glass layer 541 may include a first folding region F1 facing a first hinge device 261 between the first region DA1 and the second region DA2, and a second folding region F2 facing a second hinge device 262 between the second region DA2 and the third region DA3. According to an embodiment, the glass layer 541 may include a plurality of patterns (e.g., the plurality of first patterns 412 and the plurality of second patterns 413 of FIG. 11C) for providing, at least in the first folding region F1 and the second folding region F2, different flexibility for each region. In various embodiments, the plurality of patterns (e.g., the plurality of first patterns 412 and the plurality of second patterns 413 of FIG. 11C) may be omitted in the first region DA1, the second region DA2, and the third region DA3.

Figure 11C:
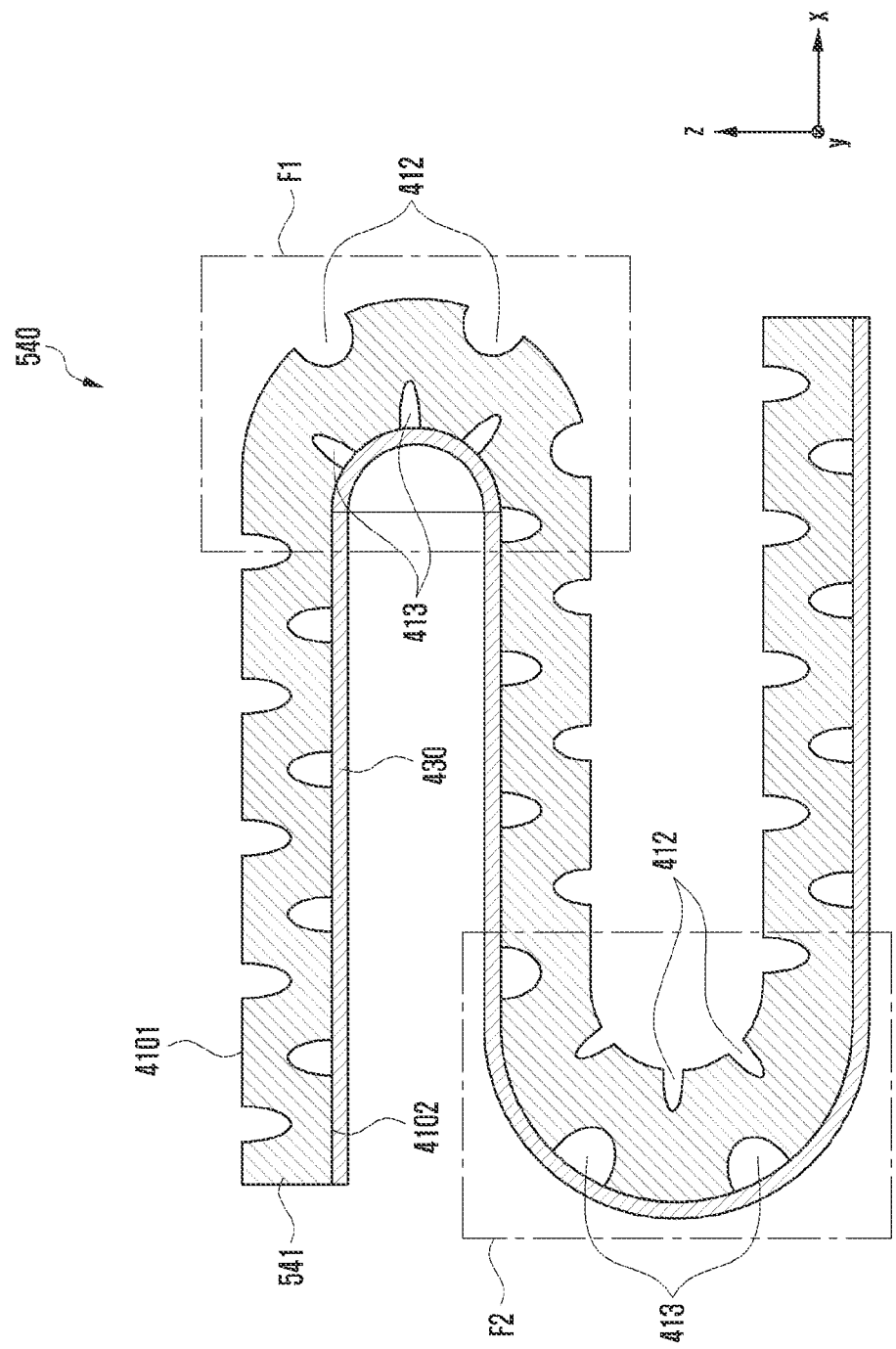
FIG. 11C is a sectional view illustrating a shape and an arrangement of a plurality of patterns according to a bending direction of a flexible display of FIG. 11A according to various embodiments.

FIG. 11C is a partial cross-sectional view illustrating a shape and an arrangement configuration of the plurality of patterns according to a bending direction of the flexible display of FIG. 11A according to various embodiments.

Referring to FIG. 11C, the glass layer 541 (e.g., the glass layer 411 of FIG. 5C) may include the first surface 4101 and the second surface 4102 facing in a direction opposite to the first surface 4101 and corresponding to the display panel 430. According to an embodiments, the glass layer 541 may include, on the first surface 4101, the plurality of first patterns 412 configured at a predetermined interval to be lower than the first surface 4101. According to an embodiments, the glass layer 541 may include, on the second surface 4102, the plurality of second patterns 413 configured at a predetermined interval to be lower than the second surface 4102.

According to various embodiments, the glass layer 541 may be configured such that an etching amount per unit area of the plurality of second patterns 413 disposed on the second surface 4102 is less than an etching amount per unit area of the plurality of first patterns 412 disposed on the first surface 4101, at least in the first folding region F1, and thus may help to improve the flexibility. In addition, the glass layer 541 may be configured such that the etching amount per unit area of the plurality of second patterns 413 disposed on the second surface 4102 is larger than the etching amount per unit area of the plurality of first patterns 412 disposed on the first surface 4101, at least in the second folding region F2, and thus may help to improve the flexibility. For example, in one electronic device 500, the etching amounts per unit area of the plurality of first patterns 412 disposed on the first surface 4101 of the glass layer 541 and the plurality of second patterns 413 disposed on the second surface 4102 may be appropriately configured according to the different bending manners of the display panel 540, so as to help to improve flexibility.

According to various embodiments, the glass layer 541 may be configured such that a shortest distance from the first surface 4101 to the second surface 4102 may, for example, be at most 300 µm or less. According to an embodiment, the glass layer 541 may be configured such that a shortest distance (e.g., the shortest distance d2 of FIG. 5C) from each of the plurality of first patterns 412 to the second surface 4102, a shortest distance (e.g., the shortest distance d1 of FIG. 5C) from each of the plurality of second patterns 413 to the first surface 4101, or a shortest distance (e.g., the shortest distance d of FIG. 5C) between each of the plurality of first patterns 412 and each of the plurality of second patterns 413 adjacent thereto has a range of, for example, about 50 µm to 150 µm, at least in the first folding region F1. According to an embodiment, the glass layer 541 may be configured such that a shortest distance (e.g., the shortest distance d2 of FIG. 5C) from each of the plurality of first patterns 412 to the second surface 4102, a shortest distance (e.g., the shortest distance d1 of FIG. 5C) from each of the plurality of second patterns 413 to the first surface 4101, or a shortest distance (e.g., the shortest distance d of FIG. 5C) between each of the plurality of first patterns 412 and each of the plurality of second patterns 413 adjacent thereto has a range of, for example, about 10 µm to 100 µm, at least in the second folding region F2.

Figure 12A:
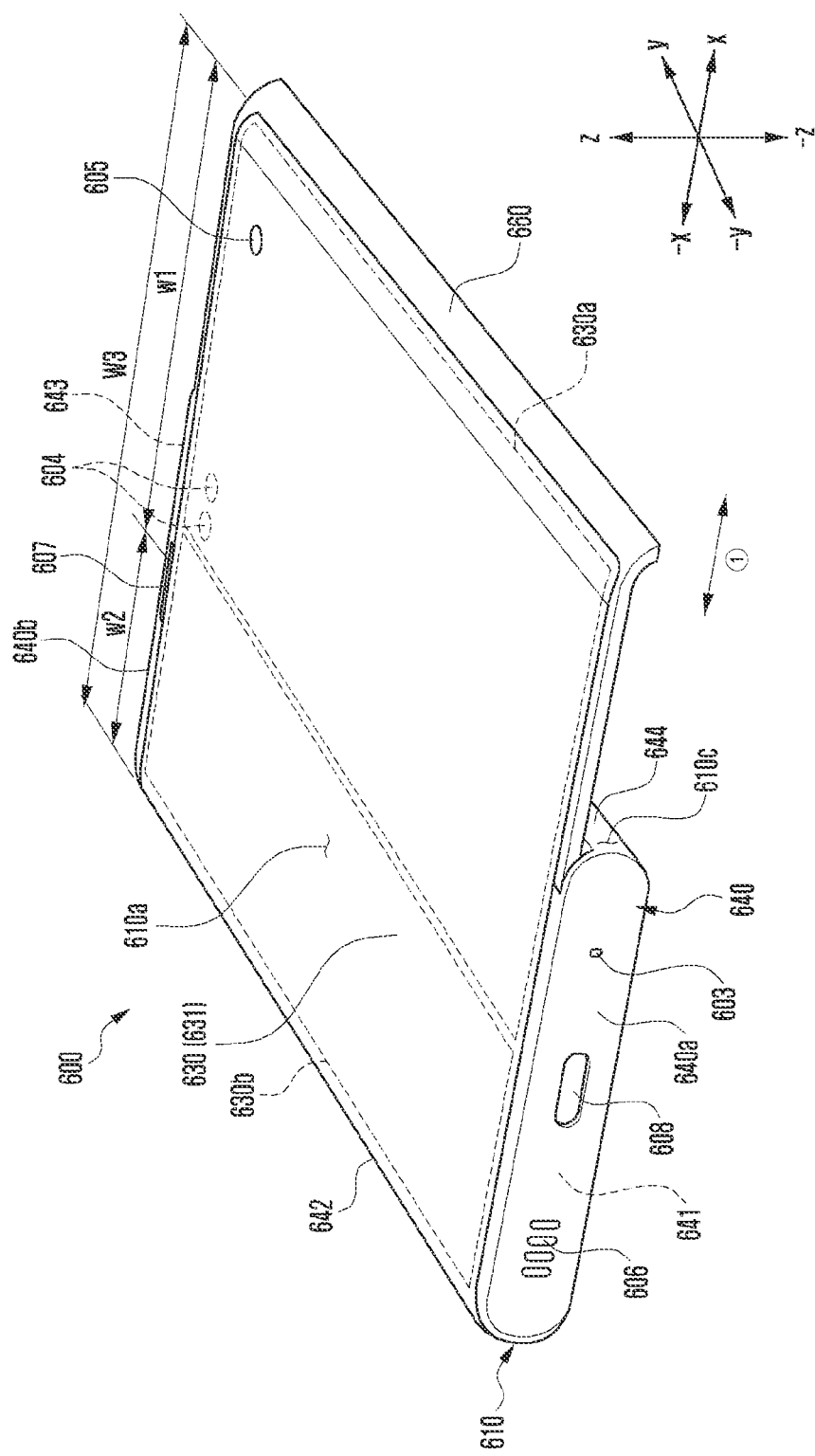
FIG. 12A is a front perspective view illustrating a slide-out state of an electronic device according to various embodiments.
Figure 12B:
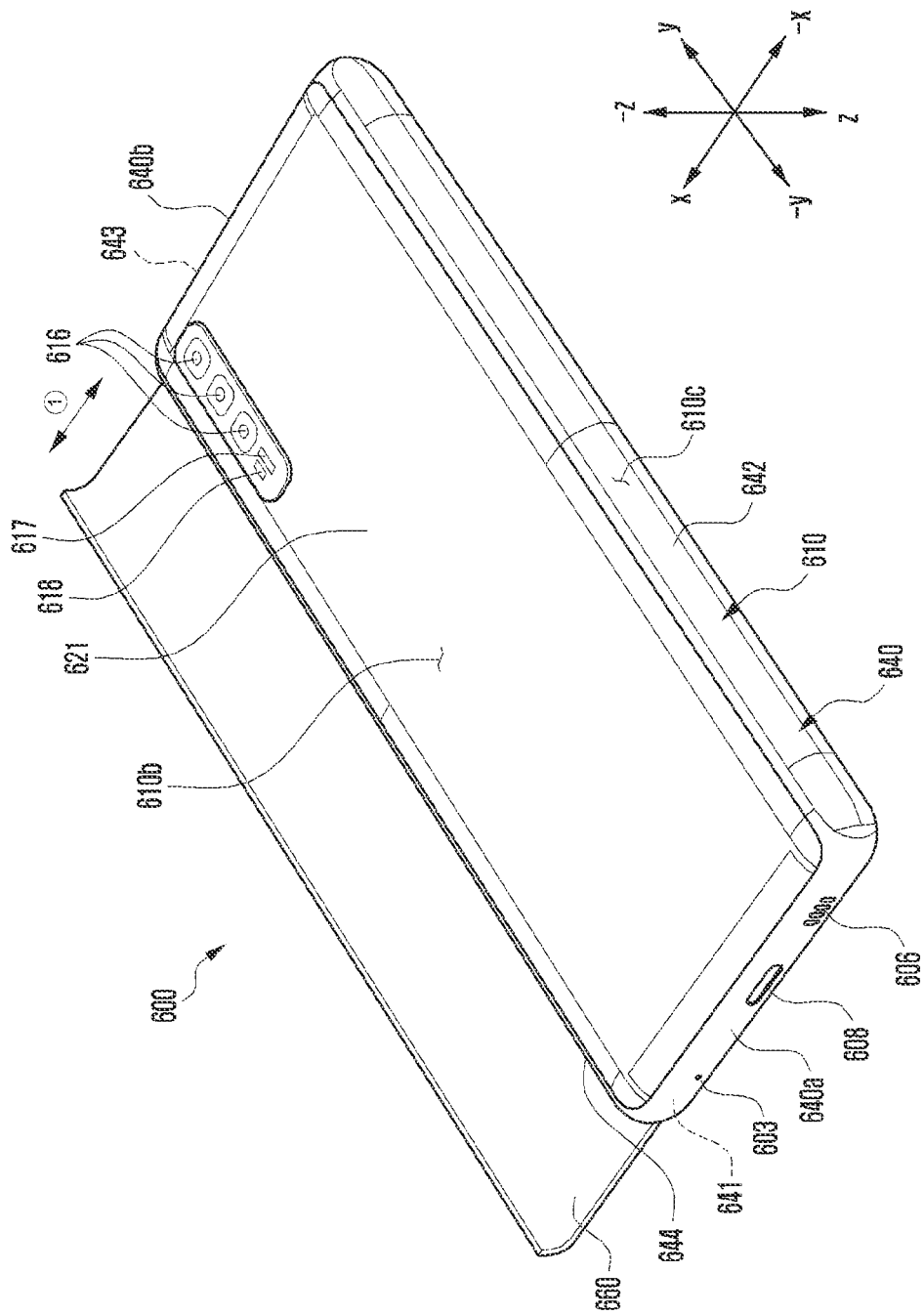
FIG. 12B is a rear perspective view illustrating a slide-out state of an electronic device according to various embodiments.

FIG. 12A is a front perspective view illustrating a slide-out state of an electronic device according to various embodiments. FIG. 12B is a rear perspective view illustrating a slide-in state of the electronic device according to various embodiments.

Referring to FIGS. 12A and 12B, an electronic device 600 may include a housing 610 (e.g., a first housing or a base housing) and a slide structure 660 (e.g., a second housing or a slide housing) which is at least partially movably coupled to the housing 610 and supports at least a part of a flexible display 630. According to an embodiment, the slide structure 660 may include a bendable member (not shown) (e.g., a multi-joint hinge or a multi-bar assembly) which is coupled to one end thereof and supports at least a part of the flexible display 630. For example, when the slide structure 660 performs a sliding operation on the housing 610, the bendable member may be at least partially slid into an inner space of the housing 610 while supporting the flexible display 630. According to an embodiment, the electronic device 600 may include the housing 610 (e.g., a housing structure) including a front surface 610*a* facing a first direction (e.g., a Z-axis direction), a rear surface 610*b* facing a second direction (a −Z-axis direction) opposite to the first direction, and a side surface member 640 surrounding the space between the front surface 610*a* and the rear surface 610*b* and including a side surface 610*c* at least partially exposed to the outside. According to an embodiment, the rear surface 610*b* may be configured through a rear cover 621 coupled to the housing 610. According to an embodiment, the rear cover 621 may be formed of a polymer, coated or colored glass, ceramic, a metal (e.g., aluminum, stainless steel (STS), or magnesium), or a combination of at least two of the materials. In various embodiments, the rear cover 621 may be integrally configured with the housing 610. According to an embodiment, at least a part of the side surface 610*c* may be disposed to be exposed to the outside through the housing 610.

According to an embodiment, the side surface member 640 may include a first side surface 641 having a first length, a second side surface 642 extending from the first side surface 641 to have a second length longer than the first length in a vertical direction, a third side surface 643 extending from the second side surface 642 to be parallel to the first side surface 641 and having the first length, and a fourth side surface 644 extending from the third side surface 643 to be parallel to the second side surface 642 and having the second length. According to an embodiment, the slide structure 660 supports the flexible display 630 and is slid out from the second side surface 642 to a direction of the fourth side surface 644 (e.g., an X-axis direction), so that a display area of the flexible display 630 may be expanded, or the slide structure is slid in from the fourth side surface 644 to a direction of the second side surface 642 (e.g., a −X-axis direction), so that the display area of the flexible display 630 may be reduced. According to an embodiment, the electronic device 600 may include a first side surface cover 640*a* and a second side surface cover 640*b* for covering the first side surface 641 and the third side surface 643. According to an embodiment, the first side surface 641 and the third side surface 643 may be disposed so as not to be exposed to the outside through the first side surface cover 640*a* and the second side surface cover 640*b*.

According to various embodiments, the electronic device 600 may include the flexible display 630 disposed to be supported by the slide structure 660. According to an embodiment, the flexible display 630 may include a first portion 630*a* (e.g., a plane portion) supported by the slide structure 660, and a second portion 630*b* (e.g., a bending portion or a bendable portion) extending from the first portion 630*a* and at least partially supported by the bendable member. According to an embodiment, at least a part of the second portion 630*b* may be slid into the inner space of the housing 610 and disposed so as not to be exposed to the outside in a slide-in state of the electronic device 600 (e.g., in a state where at least a part of the slide structure 660 is slid into the housing 610), and may be at least partially exposed to the outside so as to extend from the first portion 630*a* while being supported by at least a part of the bendable member in a slide-out state of the electronic device 600 (e.g., in a state where at least a part of the slide structure 660 is slid out from the housing 610). Accordingly, the electronic device 600 may include a rollable type or a slidable type electronic device in which a display area of the flexible display 630 is changed according to the movement of the slide structure 660 from the housing 610.

According to various embodiments, the slide structure 660 may be movably coupled in a sliding manner so as to be at least partially slid in or out from the housing 610. For example, the flexible display 630 may be configured to have a display area corresponding to a first width W1 from the second side surface 642 to the fourth side surface 644 in a slide-in state. According to an embodiment, in a state where the slide structure 660 is slid out, at least a part of the bendable member slid into the housing 610 is moved to the outside of the electronic device to additionally have a second width W2, so that the flexible display 630 may be deformed to have a display area corresponding to a third width W3 larger than the first width W1. Accordingly, according to a sliding operation of the slide structure 660, the flexible display 630 may have a variable display area corresponding to a variable width of the electronic device.

According to various embodiments, the electronic device 600 may include at least one of an input device 603, sound output devices 606 and 607, sensor modules 604 and 617, camera modules 605 and 616, a connector port 608, a key input device (not shown), or an indicator (not shown). In another embodiment, in the electronic device 600, at least one of the above-described components may be omitted or other components may be additionally included.

According to various embodiments, the input device 603 may include a microphone. In various embodiments, the input device 603 may include a plurality of microphones arranged to sense a direction of sound. The sound output devices 606 and 607 may include speakers. The sound output devices 606 and 607 may include an external speaker 606 and a call receiver 607. In another embodiment, the sound output devices 606 and 607 may include a speaker (e.g., a piezo speaker) which operates while excluding a separate speaker hole.

According to various embodiments, the sensor modules 604 and 617 may generate an electrical signal or a data value corresponding to an internal operation state of the electronic device 600 or an external environmental state thereof. The sensor modules 604 and 617 may include, for example, a first sensor module 604 (e.g., a proximity sensor or an illuminance sensor) disposed on the front surface of the electronic device and/or a second sensor module 617 (e.g., an HRM sensor) disposed on the rear surface thereof. According to an embodiment, the first sensor module 604 may be disposed under the flexible display 630 on the front surface 610*a* of the electronic device 600. According to an embodiment, the first sensor module 604 may further include at least one of a proximity sensor, an illuminance sensor, a time of flight (TOF) sensor, an ultrasonic sensor, a fingerprint sensor, a gesture sensor, a gyro sensor, an air pressure sensor, a magnetic sensor, an acceleration sensor, a grip sensor, a color sensor, an infrared (IR) sensor, a biometric sensor, a temperature sensor, or a humidity sensor.

According to various embodiments, the camera devices 605 and 616 may include a first camera device 605 disposed on the front surface 610*a* of the electronic device 600, and a second camera device 616 disposed on the rear surface 610*b* of the electronic device 600. According to an embodiment, the electronic device 600 may include a flash 618 positioned near the second camera device 616. According to an embodiment, the camera devices 605 and 616 may include one or a plurality of lenses, an image sensor, and/or an image signal processor. According to an embodiment, the first camera device 605 may be disposed under the flexible display 630 and may be configured to photograph a subject through a part of an active region of the flexible display 630. According to an embodiment, the flash 618 may include, for example, a light-emitting diode or a xenon lamp. In various embodiments, two or more lenses (wide-angle and telephoto lenses) and image sensors may be disposed on one surface of the electronic device 600.

According to various embodiments, the electronic device 600 may include at least one antenna (not shown). According to an embodiment, for example, the at least one antenna may wirelessly communicate with an external electronic device or wirelessly transmit/receive power required for charging. According to an embodiment, the antenna may include a legacy antenna, an mmWave antenna, a near field communication (NFC) antenna, a wireless charging antenna, and/or a magnetic secure transmission (MST) antenna.

According to various embodiments, the flexible display 630 may include a glass layer 631 laminated on a display panel (e.g., the display panel 430 of FIG. 5C). According to an embodiment, the glass layer 631 may include a plurality of patterns (e.g., the plurality of patterns 412 and 413 of FIG. 12C) formed in a region corresponding to the second portion 630*b* which is at least partially deformed to be bendable when the slide structure 660 slides in a specified direction (direction ①), and thus help to secure the stiffness and flexibility of the flexible display 630.

Figure 12C:
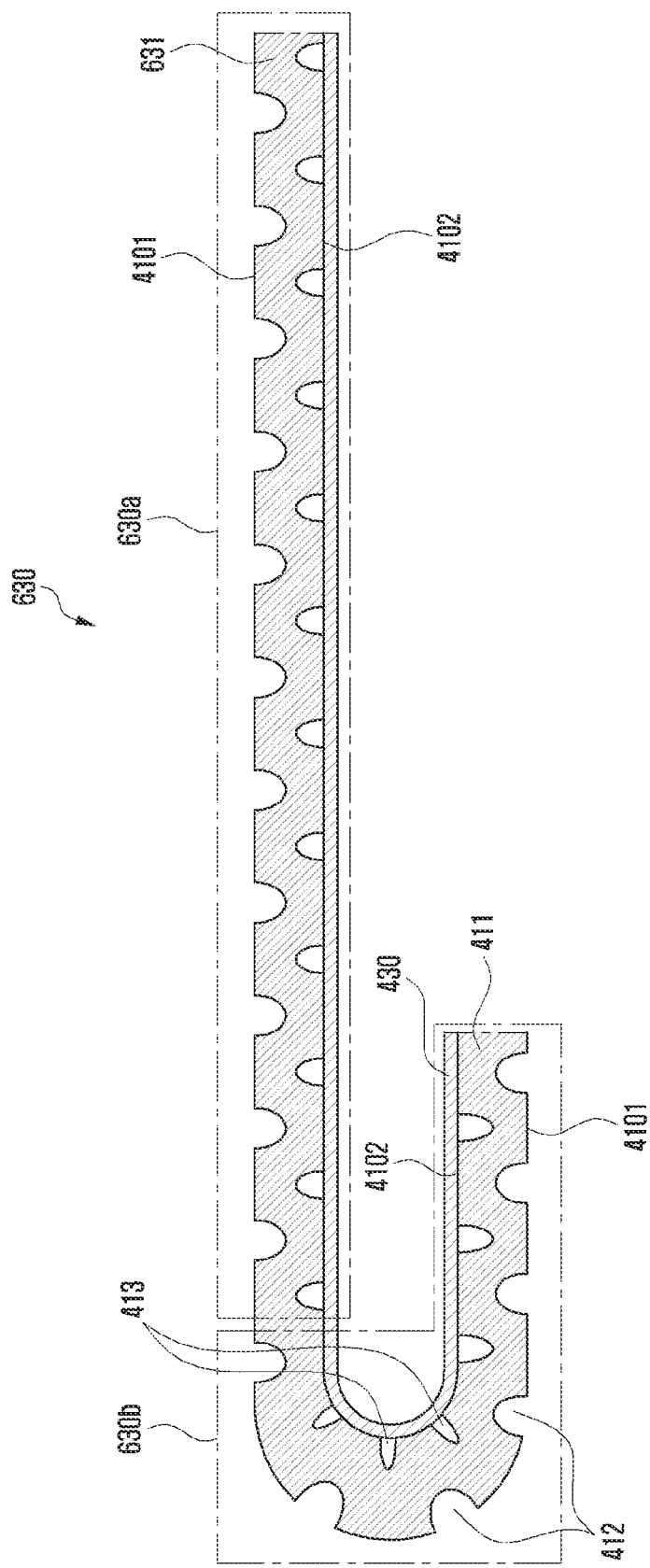
FIG. 12C is a sectional view illustrating a shape and an arrangement configuration of a plurality of patterns according to bending of a flexible display in a bendable region according to various embodiments.

FIG. 12C is a cross-sectional view illustrating a shape and an arrangement configuration of the plurality of patterns according to bending of the flexible display in a bendable region according to various embodiments.

Referring to FIG. 12C, the glass layer 631 may be configured such that an etching amount per unit area of the plurality of second patterns 413 disposed on the second surface 4102 is larger than an etching amount per unit area of the plurality of first patterns 412 disposed on the first surface 4101 in a region corresponding to at least a part of the second portion 630b of the flexible display 630, and thus may help to improve the flexibility.

According to various embodiments, the glass layer 631 may be configured such that a shortest distance from the first surface 4101 to the second surface 4102 may, for example, be at most 300 µm or less. According to an embodiment, the glass layer 631 may be configured such that a shortest distance (e.g., the shortest distance d2 of FIG. 5C) from each of the plurality of first patterns 412 to the second surface 4102, a shortest distance (e.g., the shortest distance d1 of FIG. 5C) from each of the plurality of second patterns 413 to the first surface 4101, or a shortest distance (e.g., the shortest distance d of FIG. 5C) between each of the plurality of first patterns 412 and each of the plurality of second patterns 413 adjacent thereto has a range of, for example, about 10 µm to 100 µm in a region corresponding to at least the second portion 630b.

According to various example embodiments, an electronic device (e.g., the electronic device 100 of FIG. 1A) may include: a first housing (e.g., the first housing 110 of FIG. 1A), a second housing (e.g., the second housing 120 of FIG. 1A) foldably connected to the first housing through a hinge (e.g., the hinge device 140 of FIG. 1B), and a flexible display (e.g., the flexible display 400 of FIG. 1A) supported by the first housing and the second housing, the flexible display including a window layer (e.g., the window layer 410 of FIG. 5A) having a first surface facing a first direction (e.g., the first surface 4101 of FIG. 5C) and a second surface (e.g., the second surface 4102 of FIG. 5C) facing a second direction opposite to the first direction, and includes a glass layer (e.g., the glass layer 411 of FIG. 5C), and a display panel (e.g., the display panel 430 of FIG. 4) disposed to correspond to the second surface under the window layer, wherein the glass layer includes a plurality of first patterns (e.g., the plurality of first patterns 412 of FIG. 5C) on the first surface, a surface of the first patterns being lower than the first surface, and a plurality of second patterns (e.g., the plurality of second patterns 413 of FIG. 5C) on the second surface, a surface of the second patterns being lower than the second surface, and a first etching amount per unit area of the plurality of first patterns and a second etching amount per unit area of the plurality of second patterns are different.

According to various example embodiments, the first etching amount and/or the second etching amount may correspond to an etching depth of the plurality of first patterns and/or the plurality of second patterns.

According to various example embodiments, the first etching amount and/or the second etching amount may correspond to an etching shape of the plurality of first patterns and/or the plurality of second patterns.

According to various example embodiments, the first etching amount and/or the second etching amount may correspond to an arrangement density of the plurality of first patterns and/or the plurality of second patterns.

According to various example embodiments, the window layer may further include a filler filled in the plurality of first patterns and/or the plurality of second patterns.

According to various example embodiments, a refractive index of the filler may be substantially the same as a refractive index of the glass layer.

According to various example embodiments, the window layer may further include a planarization layer laminated on the first surface and/or the second surface.

According to various example embodiments, the planarization layer may be formed of the same material as the filling member.

According to various example embodiments, the window layer may further include at least one protective layer including a polymer material and laminated on the planarization layer.

According to various example embodiments, the window layer may include a first region corresponding to the first housing, a second region corresponding to the second housing, and a bendable third region connecting the first region and the second region, and the plurality of first patterns and/or the plurality of second patterns may be disposed in parts corresponding to the first region, the second region, and the third region of the glass layer.

According to various example embodiments, the window layer may include a first region corresponding to the first housing, a second region corresponding to the second housing, and a third region which connects the first region and the second region and is bendable, and the plurality of first patterns and/or the plurality of second patterns may be disposed in a part corresponding to the third region of the glass layer.

According to various example embodiments, a vertical distance between each unit pattern of the plurality of first patterns and the second surface may be at least 30 µm.

According to various example embodiments, a vertical distance between each unit pattern of the plurality of second patterns and the first surface may be at least 30 µm.

According to various example embodiments, a shortest distance between each unit pattern of the plurality of first patterns and each unit pattern of the plurality of second patterns adjacent thereto may be at least 30 µm.

According to various example embodiments, the electronic device may be configured to be folded wherein at least parts of the flexible display face each other (an in-folding type), and the second etching amount may be greater than the first etching amount.

According to various example embodiments, the electronic device may be configured to be folded wherein at least parts of the flexible display face in opposite directions (an out-folding type), and the second etching amount may be less than the first etching amount.

According to various example embodiments, the glass layer may have a thickness having a vertical distance from the first surface to the second surface in a range of 50 µm to 300 µm.

According to various example embodiments, an electronic device (e.g., the electronic device 100 of FIG. 1A) may include: a housing (e.g., the first housing 110 and the second housing 120 of FIG. 1A), and a flexible display (e.g., the flexible display 400 of FIG. 1A) including a bending region at least partially bendable through support of the housing, the flexible display including a window layer (e.g., the window layer 410 of FIG. 5A) having a first surface facing a first direction (e.g., the first surface 4101 of FIG. 5C) and a second surface (e.g., the second surface 4102 of FIG. 5C) facing in a second direction opposite to the first direction, and includes a glass layer (e.g., the glass layer 411 of FIG. 5C), and a display panel (e.g., the display panel 430 of FIG. 4) corresponding to the second surface under the window layer, wherein the glass layer includes a plurality of first patterns (e.g., the plurality of first patterns 412 of FIG. 5C) on the first surface, a surface of the first patterns being lower than the first surface, and a plurality of second patterns (e.g., the plurality of second patterns 413 of FIG. 5C) on the second surface, a surface of the second patterns being lower than the second surface, and a first etching amount per unit area of the plurality of first patterns and a second etching amount per unit area of the plurality of second patterns are different.

According to various example embodiments, the first etching amount and/or the second etching amount may correspond to at least one of an etching depth, an etching shape, or an arrangement density of the plurality of first patterns and/or the plurality of second patterns.

According to various example embodiments, an electronic device (e.g., the electronic device 100 of FIG. 1A) may include: a first housing (e.g., the first housing 110 of FIG. 1A), a second housing (e.g., the second housing 120 of FIG. 1A) foldably connected to the first housing through a hinge (e.g., the hinge device 140 of FIG. 1B), and a flexible display (e.g., the flexible display 400 of FIG. 1A) supported by the first housing and the second housing, the flexible display including a window layer (e.g., the window layer 410 of FIG. 5A) having a first surface (e.g., the first surface 4101 of FIG. 5C) facing a first direction and a second surface (e.g., the second surface 4102 of FIG. 5C) facing a second direction opposite to the first direction, and includes a glass layer (e.g., the glass layer 411 of FIG. 5C), and a display panel (e.g., the display panel 430 of FIG. 4) corresponding to the second surface under the window layer, wherein the glass layer includes a plurality of patterns (e.g., the plurality of first patterns 412 or the plurality of second patterns 413 of FIG. 5C) on the first surface, a surface of the plurality of patterns being lower than the first surface or on the second surface, a surface of the plurality of patterns being lower than the second surface, and the plurality of patterns have a zigzag shape.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing foldably connected to the first housing through at least a hinge; and
   a flexible display supported by the first housing and the second housing, the flexible display comprising:
     a window layer comprising a glass layer, the glass layer having a first surface and a second surface facing a direction opposite to the first surface; and
     a display panel corresponding to the second surface under the window layer, wherein the glass layer comprises:
     a plurality of first patterns on the first surface, a surface of the plurality of first patterns being lower than the first surface; and
     a plurality of second patterns on the second surface, a surface of the plurality of second patterns being lower than the second surface, and wherein a first etching amount per unit area of the plurality of first patterns and a second etching amount per the unit area of the plurality of second patterns are different, and
   wherein the plurality of first patterns and the plurality of second patterns are disposed in a manner in which a first virtual line passing through a center of each of the plurality of first patterns does not coincide with a second virtual line passing through a center of each of the plurality of second patterns.

2. The electronic device of claim 1, wherein the first etching amount and/or the second etching amount are determined through an etching depth of the plurality of first patterns and/or the plurality of second patterns.

3. The electronic device of claim 1, wherein the first etching amount and/or the second etching amount are determined through an etching shape of the plurality of first patterns and/or the plurality of second patterns.

4. The electronic device of claim 1, wherein the first etching amount and/or the second etching amount are determined through an arrangement density of the plurality of first patterns and/or the plurality of second patterns.

5. The electronic device of claim 1, wherein the window layer further comprises a filler filled in the plurality of first patterns and/or the plurality of second patterns.

6. The electronic device of claim 5, wherein a refractive index of the filler is substantially the same as a refractive index of the glass layer.

7. The electronic device of claim 5, wherein the window layer further comprises a planarization layer laminated on the first surface and/or the second surface.

8. The electronic device of claim 7, wherein the planarization layer is formed of the same material as that of the filler.

9. The electronic device of claim 7, wherein the window layer further comprises at least one protective layer comprising a polymer material and laminated on the planarization layer.

10. The electronic device of claim 1, wherein the window layer comprises:
    a first region corresponding to the first housing;
    a second region corresponding to the second housing; and
    a bendable third region connecting the first region and the second region, and
    wherein the plurality of first patterns and/or the plurality of second patterns are arranged in parts corresponding to the first region, the second region, and the third region of the glass layer.

11. The electronic device of claim 1, wherein the window layer comprises:
    a first region corresponding to the first housing;
    a second region corresponding to the second housing; and
    a bendable third region connecting the first region and the second region, and
    wherein the plurality of first patterns and/or the plurality of second patterns are arranged in a part corresponding to the third region of the glass layer.

12. The electronic device of claim 1, wherein a vertical distance between each unit pattern of the plurality of first patterns and the second surface is at least 30 µm.

13. The electronic device of claim 1, wherein a vertical distance between each unit pattern of the plurality of second patterns and the first surface is at least 30 µm.

14. The electronic device of claim 1, wherein a shortest distance between each unit pattern of the plurality of first patterns and each unit pattern of the plurality of second patterns adjacent thereto is at least 30 µm.

15. The electronic device of claim 1, wherein the electronic device is configured to be folded such that at least parts of the flexible display face each other in an in-folding type, and
wherein the second etching amount is greater than the first etching amount.

16. The electronic device of claim 1, wherein the electronic device is configured to be folded such that at least parts of the flexible display face in opposite directions in an out-folding type, and
wherein the second etching amount is less than the first etching amount.

17. The electronic device of claim 1, wherein the glass layer has a thickness having a vertical distance from the first surface to the second surface in a range of 50 µm to 300 µm.

18. An electronic device comprising:
at least one housing; and
a flexible display comprising a bending region at least partially bendable through support of the at least one housing, the flexible display comprising:
a window layer comprising a glass layer, the glass layer having a first surface and a second surface facing a direction opposite to the first surface; and
a display panel corresponding to the second surface under the window layer, wherein the glass layer comprises:
a plurality of first patterns on the first surface, a surface of the plurality of first patterns being lower than the first surface; and
a plurality of second patterns on the second surface, a surface of the plurality of second patterns being lower than the second surface, and
wherein a first etching amount per unit area of the plurality of first patterns and a second etching amount per the unit area of the plurality of second patterns are different, and
wherein the plurality of first patterns and the plurality of second patterns are disposed in a manner in which a first virtual line passing through a center of each of the plurality of first patterns does not coincide with a second virtual line passing through a center of each of the plurality of second patterns.

19. The electronic device of claim 18, wherein the first etching amount and/or the second etching amount is determined through at least one of an etching depth, an etching shape, or an arrangement density of the plurality of first patterns and/or the plurality of second patterns.

20. An electronic device comprising:
a first housing;
a second housing foldably connected to the first housing through a hinge; and
a flexible display supported by the first housing and the second housing, the flexible display comprising:
a window layer comprising a glass layer, the glass layer having a first surface and a second surface facing a direction opposite to the first surface; and
a display panel corresponding to the second surface under the window layer,
a plurality of first patterns on the first surface, a surface of the plurality of first patterns being lower than the first surface, and
a plurality of second patterns on the second surface, a surface of the plurality of second patterns being lower than the second surface,
wherein the plurality of first patterns and the plurality of second patterns are disposed in a manner in which a first virtual line passing through a center of each of the plurality of first patterns does not coincide with a second virtual line passing through a center of each of the plurality of second patterns.

* * * * *